US012659738B2

(12) United States Patent
Orsino et al.

(10) Patent No.: US 12,659,738 B2
(45) Date of Patent: Jun. 16, 2026

(54) GENERATING AN AUTHENTICATION TOKEN

(71) Applicant: Telefonaktiebolaget LM Ericsson (publ), Stockholm (SE)

(72) Inventors: Antonino Orsino, Kirkkonummi (FI); Prajwol Kumar Nakarmi, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 111 days.

(21) Appl. No.: 18/576,941

(22) PCT Filed: Jul. 6, 2022

(86) PCT No.: PCT/SE2022/050690
§ 371 (c)(1),
(2) Date: Jan. 5, 2024

(87) PCT Pub. No.: WO2023/282834
PCT Pub. Date: Jan. 12, 2023

(65) Prior Publication Data
US 2024/0314558 A1 Sep. 19, 2024

Related U.S. Application Data

(60) Provisional application No. 63/219,484, filed on Jul. 8, 2021.

(51) Int. Cl.
*H04L 29/06* (2006.01)
*H04W 12/06* (2021.01)
(Continued)

(52) U.S. Cl.
CPC ......... *H04W 12/06* (2013.01); *H04W 12/084* (2021.01); *H04W 76/27* (2018.02)

(58) Field of Classification Search
CPC ... H04W 12/06; H04W 12/084; H04W 76/27; H04W 12/037; H04W 12/106; H04W 12/122
See application file for complete search history.

(56) References Cited

U.S. PATENT DOCUMENTS

| | | | | |
|---|---|---|---|---|
| 10,873,499 B2 * | 12/2020 | Afzal | | H04M 15/41 |
| 2018/0091485 A1 * | 3/2018 | Lee | | H04L 63/0428 |

(Continued)

FOREIGN PATENT DOCUMENTS

| | | | | |
|---|---|---|---|---|
| CN | 108243144 A * | 7/2018 | | H04W 12/10 |
| EP | 3 373 653 A1 | 9/2018 | | |

(Continued)

OTHER PUBLICATIONS

Latheef et al., "On the UE Context Retrieval Enhancements for Improved Inter-RAT Mobility", 2020 IEEE 3rd 5G World Forum (5GWF), Date of Conference Sep. 10-12, 2020.*

(Continued)

*Primary Examiner* — Morshed Mehedi
(74) *Attorney, Agent, or Firm* — Rothwell, Figg, Ernst & Manbeck, P.C.

(57) ABSTRACT

A method (1000) for generating an authentication token. The method includes obtaining (s1002) a first connection resume request message that comprises: i) a first field containing a cause value, ii) a second field containing an identity value, and iii) a third field containing a pre-defined token value. The method further includes using (s1004) the first connection resume request message to generate an authentication token.

18 Claims, 10 Drawing Sheets

(51) Int. Cl.
    *H04W 12/084*     (2021.01)
    *H04W 76/27*     (2018.01)

(56) References Cited

U.S. PATENT DOCUMENTS

| | | | |
|---|---|---|---|
| 2018/0249479 | A1 | 8/2018 | Cho et al. |
| 2019/0149326 | A1 | 5/2019 | Li et al. |
| 2019/0253895 | A1 | 8/2019 | Xu et al. |
| 2019/0313333 | A1 | 10/2019 | Kim et al. |
| 2019/0320316 | A1 | 10/2019 | Mildh et al. |
| 2019/0320318 | A1 | 10/2019 | Lehtovirta et al. |
| 2019/0320488 | A1 | 10/2019 | Mildh et al. |
| 2020/0008188 | A1* | 1/2020 | Nam .................. H04W 72/046 |
| 2020/0092727 | A1 | 3/2020 | Basu Mallick et al. |
| 2020/0229263 | A1* | 7/2020 | Rajadurai ............. H04W 12/06 |
| 2021/0076198 | A1 | 3/2021 | Mildh et al. |
| 2021/0160691 | A1 | 5/2021 | Liu |
| 2022/0007255 | A1 | 1/2022 | Rugeland et al. |
| 2022/0394476 | A1* | 12/2022 | Da Silva ............... H04L 9/3242 |
| 2024/0314558 | A1* | 9/2024 | Orsino ................ H04W 12/106 |
| 2025/0039671 | A1 | 1/2025 | Da Silva et al. |

FOREIGN PATENT DOCUMENTS

| | | | | |
|---|---|---|---|---|
| EP | 044 760 | B1 | 10/2024 | |
| JP | 2023-500145 | A | 1/2023 | |
| WO | 2018/202941 | A1 | 11/2018 | |
| WO | 2019/030727 | A1 | 2/2019 | |
| WO | 2019/097458 | A1 | 5/2019 | |
| WO | WO-2020058168 | A1 * | 3/2020 | ........... H04L 9/3213 |
| WO | 2021/088471 | A1 | 5/2021 | |
| WO | 2021/096411 | A1 | 5/2021 | |

OTHER PUBLICATIONS

Nandy et al., "Review on Security of Internet of Things Authentication Mechanism," in IEEE Access, vol. 7, pp. 151054-151089 (Year: 2019).*

"Chinese Patent Application No. CN201911089532.6", Filed Nov. 8, 2019, Jul. 31, 2020 (27 pages).

"English language translation of Chinese Patent Application No. CN201911089532.6", 2019 (48 pages).

"English language translation of WO2021/088471 A1", 2019 (26 pages).

Non-Final Office Action issued in U.S. Appl. No. 17/775,631 (Publication No. 2022/0394476 A1) dated Jan. 31, 2025 (15 pages).

3GPP TS 33.401 V15.9.0 (Sep. 2019) (163 pages).

3GPP TR 33.809 V0.7.0 (Oct. 2019) (66 pages).

3GPP TS 33.501 V15.1.0 (Jun. 2018) (152 pages).

Huawei et al., "RRC Resume Request Authentication Token Calculation", 3GPP TSG SA WG3 (Security) Meeting #92, S3-182851, Sep. 24-28, 2018, Harbin (China) (4 pages).

Huawei et al., "Discussion on security algorithm negotiation issue for Resume, RNAU and Reestablishment", 3GPP TSG-RAN WG2 Meeting #104, R2-1817880, Spokane, USA, Nov. 12-16, 2018 (12 pages).

International Search Report and Written Opinion issued in International Application No. PCT/SE2022/050690 dated Oct. 3, 2022 (13 pages).

Ericsson, "Security for RRCResumeRequest message", 3GPP TSG-RAN WG2 #101, R2-1802373, Athens, Greece, Mar. 26-2, 2018 (8 pages).

Ericsson, "Security for RRCConnectionResumeRequest message", 3GPP TSG-RAN WG2 #NR AH1801, Tdoc R2-1800431, Vancouver, Canada, Jan. 22-26, 2018 (8 pages).

Catt, "RRC connection re-establishment and resume procedures in NR", 3GPP TSG-RAN WG2 #99bis, R2-1710279, Prague, Czech Republic, Oct. 9-13, 2017 (6 pages).

Ericsson, "Security for RRC Connection Suspend and Resume" 3GPP TSG-SA WG3 Meeting #83, S3-160588, San Jose Del Cabo, Mexico, May 9-13, 2016 (3 pages).

3GPP TR 33.809 V0.15.0 (May 2021) (113 pages).

3GPP TS 22.261 V17.7.0 (Jun. 2021) (83 pages).

3GPP TS 23.501 V17.1.1 (Jun. 2021) (526 pages).

3GPP TS 23.502 V17.1.0 (Jun. 2021) (692 pages).

3GPP TS 24.501 V17.3.0 (Jun. 2021) (825 pages).

3GPP TS 33.501 V16.7.0 (Jun. 2021) (255 pages).

3GPP TS 36.331 V16.5.0 (Jun. 2021) (1091 pages).

3GPP TS 38.304 V16.4.0 (Mar. 2021) (39 pages).

3GPP TS 38.306 V16.5.0 (Jun. 2021) (153 pages).

3GPP TS 38.331 V16.4.1 (Mar. 2021) (949 pages).

3GPP TS 38.423 V16.5.0 (Apr. 2021) (461 pages).

SA3, "LS on security protection on RRCResumeRequest message," (3GPP Doc. S3-212349) (May 2021) (2 pages).

3GPP TS 38.331 V16.5.0 (Jun. 2021) (11 pages).

Non-Final Office Action issued in related U.S. Patent Application No. 18/913,136 dated Feb. 25, 2026 (12 pages).

\* cited by examiner

UL / DL data gNB

Timer Expires

RRCRelease (with suspend indication)

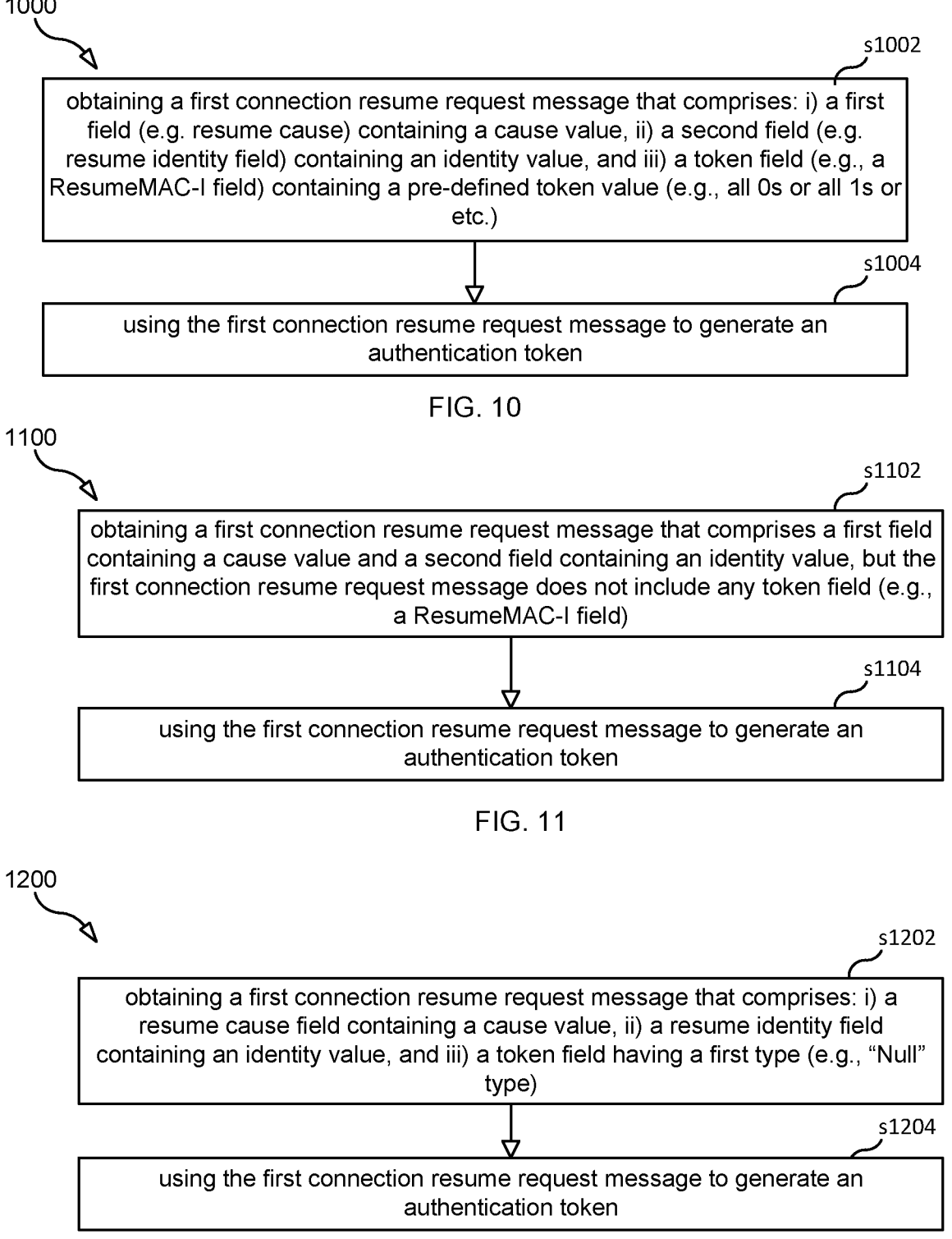

1000 s1002 obtaining a first connection resume request message that comprises: i) a first field (e.g. resume cause) containing a cause value, ii) a second field (e.g. resume identity field) containing an identity value, and iii) a token field (e.g., a ResumeMAC-I field) containing a pre-defined token value (e.g., all 0s or all 1s or etc.)

s1004 using the first connection resume request message to generate an authentication token

FIG. 10

1100 s1102 obtaining a first connection resume request message that comprises a first field containing a cause value and a second field containing an identity value, but the first connection resume request message does not include any token field (e.g., a ResumeMAC-I field)

s1104 using the first connection resume request message to generate an authentication token

FIG. 11

1200 s1202 obtaining a first connection resume request message that comprises: i) a resume cause field containing a cause value, ii) a resume identity field containing an identity value, and iii) a token field having a first type (e.g., "Null" type)

s1204 using the first connection resume request message to generate an authentication token

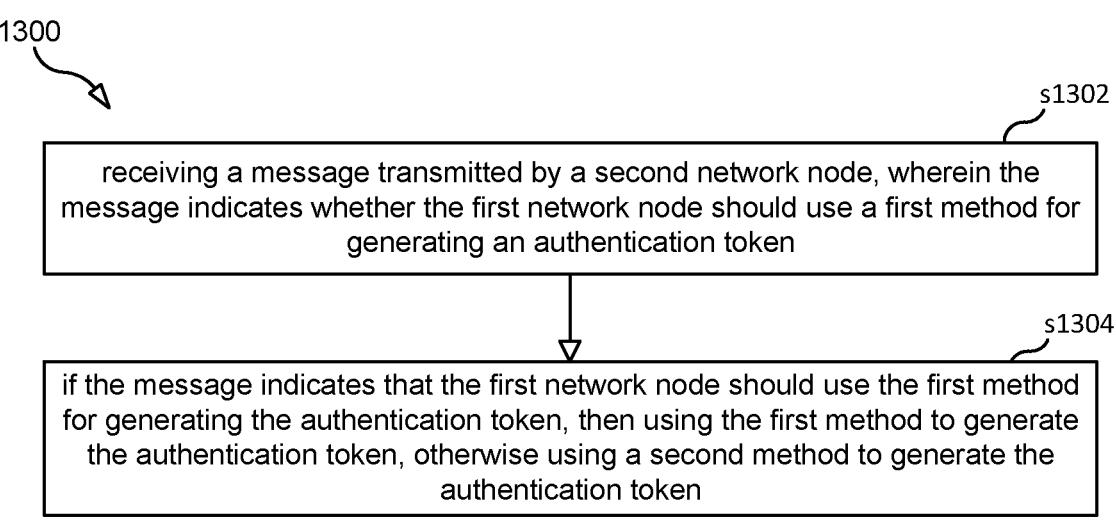

s1302 receiving a message transmitted by a second network node, wherein the message indicates whether the first network node should use a first method for generating an authentication token s1304 if the message indicates that the first network node should use the first method for generating the authentication token, then using the first method to generate the authentication token, otherwise using a second method to generate the authentication token

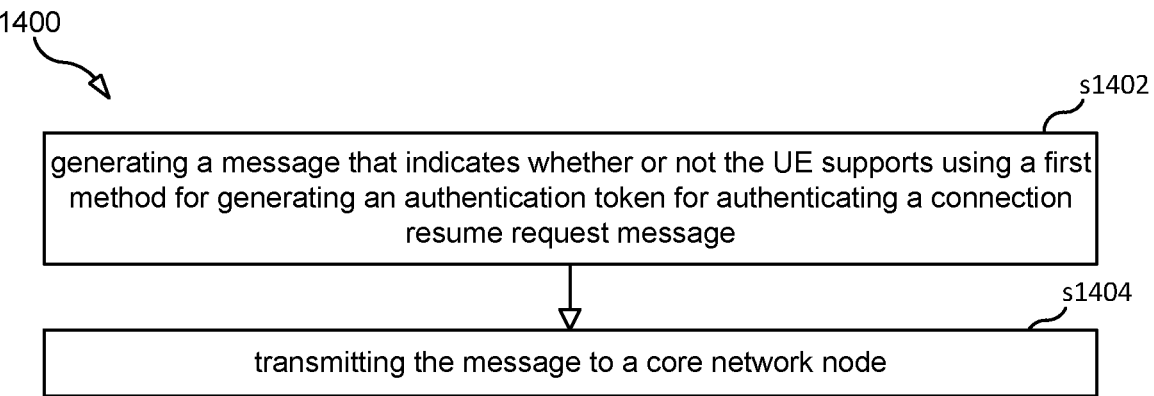

s1402 generating a message that indicates whether or not the UE supports using a first method for generating an authentication token for authenticating a connection resume request message s1404 transmitting the message to a core network node

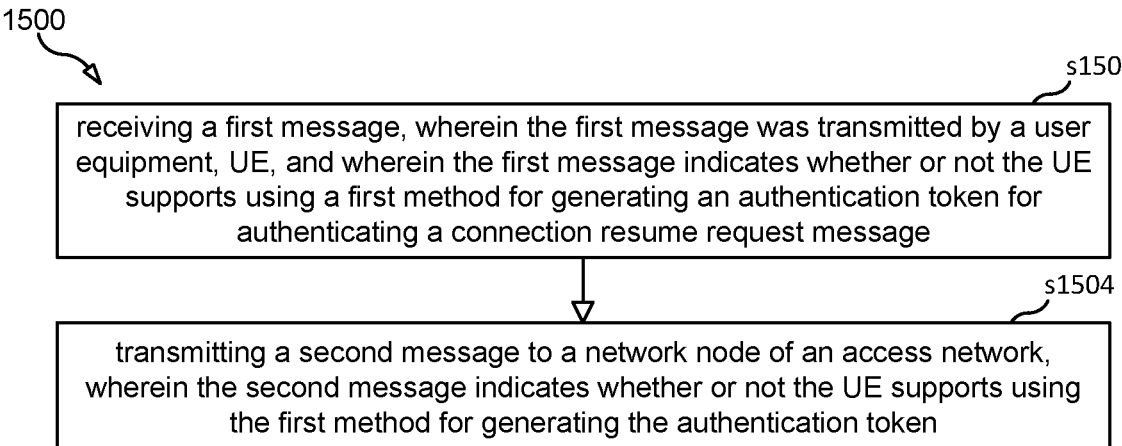

s1502 receiving a first message, wherein the first message was transmitted by a user equipment, UE, and wherein the first message indicates whether or not the UE supports using a first method for generating an authentication token for authenticating a connection resume request message s1504 transmitting a second message to a network node of an access network, wherein the second message indicates whether or not the UE supports using the first method for generating the authentication token

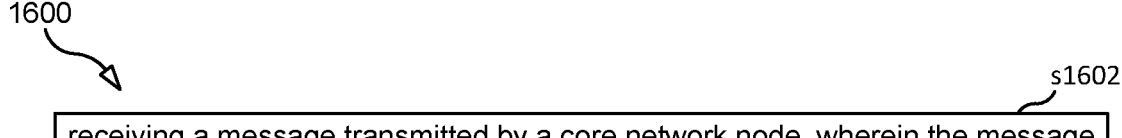

s1602 receiving a message transmitted by a core network node, wherein the message identifies a UE and indicates whether or not the identified UE supports using a first method for generating an authentication token for authenticating a connection resume request message s1604 determining, based on the message received from the core network node, whether to use the first method or a second method to generate an authentication token for use in authenticating a connection resume request transmitted by the identified UE

A network node transmitting information to a UE, wherein i) the information indicates that the network node supports using a first method for generating an authentication token for authenticating a connection resume request message and/or ii) the information instructs the UE to use the first method to generate the authentication token for authenticating a connection resume request message

FIG. 17

1800 s1802 receiving information transmitted by a network node of an access network, wherein i) the information indicates that the network node supports using a first method for generating an authentication token for authenticating a connection resume request message and/or ii) the information instructs the UE to use the first method to generate the authentication token for authenticating a connection resume request message

FIG. 18

1900 s1902 transmitting to a source node/device a message comprising: i) a first connection resume request message that the target received from a UE or ii) a second resume request message that the target generated based on the first connection resume request message

FIG. 19

GENERATING AN AUTHENTICATION TOKEN

CROSS REFERENCE TO RELATED APPLICATIONS

This application is a 35 U.S.C. § 371 National Stage of International Patent Application No. PCT/SE2022/050690, filed 2022 Jul. 6, which claims priority to provisional U.S. Patent Application No. 63/219,484, filed 2021 Jul. 8, which is incorporated by this reference.

TECHNICAL FIELD

This disclosure relates to generating an authentication token for a Radio Resource Control (RRC) message, such as an RRCResumeRequest message or an RRCResumeRequest1 message.

BACKGROUND

RRC Connection Resume

The RRC Connection Resume procedure is used to resume a suspended RRC connection, including resuming one or more Signaling Radio Bearers (SRB(s)) and one or more Data Radio Bearers (DRB(s)) or perform a Radio Access Network Based Notification Area (RNA) update.

Conditions for Resuming RRC Connection for Sidelink (SL) Communication

For New Radio (NR) sidelink communication an RRC connection is resumed only in the following cases: 1) if configured by upper layers to transmit NR sidelink communication and related data is available for transmission and 2) if the frequency on which a user equipment (UE) is configured to transmit NR sidelink communication is included in sl-FreqInfoList within System Information Block 12 (SIB12) provided by a cell on which the UE camps, and if a valid version of SIB12 does not include sl-TxPoolSelectedNormal for the concerned frequency.

For Vehicle-to-everything (V2X) sidelink communication an RRC connection resume is initiated only when the conditions specified for V2X sidelink communication in subclause 5.3.3.1a of 3rd Generation Partnership Project (3GPP) Technical Specification (TS) 36.331 V16.5.0 ("TS 36.331") are met. It is noted that upper layers initiate an RRC connection resume. The interaction with Non Access Stratum (NAS) is left to UE implementation.

Initiation

As explained in 3GPP TS 38.331 V16.4.1 ("TS 38.331"), the UE initiates the procedure when upper layers or Access Stratum (AS) (when responding to Radio Access Network (RAN) paging, upon triggering RNA updates while the UE is in RRC_INACTIVE, or for sidelink communication as specified in sub-clause 5.3.13.1a) requests the resume of a suspended RRC connection. As further noted, the "UE shall ensure having valid and up to date essential system information as specified in clause 5.2.2.2 before initiating this procedure." TS 38.331 states:

"Upon initiation of the procedure, the UE shall:
1> if the resumption of the RRC connection is triggered by response to NG-RAN paging:
  2> select '0' as the Access Category;
  2> perform the unified access control procedure as specified in 5.3.14 using the selected Access Category and one or more Access Identities provided by upper layers;

3> if the access attempt is barred, the procedure ends;
1> else if the resumption of the RRC connection is triggered by upper layers:
  2> if the upper layers provide an Access Category and one or more Access Identities:
    3> perform the unified access control procedure as specified in 5.3.14 using the Access Category and Access Identities provided by upper layers;
      4> if the access attempt is barred, the procedure ends;
  2> set the resumeCause in accordance with the information received from upper layers;
1> else if the resumption of the RRC connection is triggered due to an RNA update as specified in 5.3.13.8:
  2> if an emergency service is ongoing:
NOTE: How the RRC layer in the UE is aware of an ongoing emergency service is up to UE implementation.
    3> select '2' as the Access Category;
    3> set the resumeCause to emergency;
  2> else:
    3> select '8' as the Access Category;
  2> perform the unified access control procedure as specified in 5.3.14 using the selected Access Category and one or more Access Identities to be applied as specified in TS 24.501 [23];
    3> if the access attempt is barred:
      4> set the variable pendingRNA-Update to true;
      4> the procedure ends;
1> if the UE is in NE-DC or NR-DC:
  2> if the UE does not support maintaining SCG configuration upon connection resumption:
    3> release the MR-DC related configurations (i.e., as specified in 5.3.5.10) from the UE Inactive AS context, if stored;
1> if the UE does not support maintaining the MCG SCell configurations upon connection resumption:
  2> release the MCG SCell(s) from the UE Inactive AS context, if stored;
1> apply the default L1 parameter values as specified in corresponding physical layer specifications, except for the parameters for which values are provided in SIB1;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> release idc-AssistanceConfig from the UE Inactive AS context, if stored;
1> release drx-PreferenceConfig for all configured cell groups from the UE Inactive AS context, if stored;
1> stop all instances of timer T346a, if running;
1> release maxBW-PreferenceConfig for all configured cell groups from the UE Inactive AS context, if stored;
1> stop all instances of timer T346b, if running;
1> release maxCC-PreferenceConfig for all configured cell groups from the UE Inactive AS context, if stored;
1> stop all instances of timer T346c, if running;
1> release maxMIMO-LayerPreferenceConfig for all configured cell groups from the UE Inactive AS context, if stored;

1> stop all instances of timer T346d, if running;

1> release minSchedulingOffsetPreferenceConfig for all configured cell groups from the UE Inactive AS context, if stored;

1> stop all instances of timer T346e, if running;

1> release releasePreferenceConfig from the UE Inactive AS context, if stored;

1> stop timer T346f, if running;

1> release referenceTimePreferenceReporting from the UE Inactive AS context, if stored;

1> release sl-AssistanceConfigNR from the UE Inactive AS context, if stored;

1> apply the CCCH configuration as specified in 9.1.1.2;

1> apply the timeAlignmentTimerCommon included in SIB1;

1> start timer T319;

1> set the variable pendingRNA-Update to false;

1> initiate transmission of the RRCResumeRequest message or RRCResumeRequest1 in accordance with 5.3.13.3."

Actions Related to Transmission of RRCResumeRequest or RRCResumeRequest1 Message:

TS 38.331 states:

"The UE shall set the contents of RRCResumeRequest or RRCResumeRequest/message as follows:

1> if field useFullResumeID is signalled in SIB1:

2> select RRCResumeRequest1 as the message to use;

2> set the resumeIdentity to the stored fullI-RNTI value;

1> else:

2> select RRCResumeRequest as the message to use;

2> set the resumeIdentity to the stored shortI-RNTI value;

1> restore the RRC configuration, RoHC state, the stored QoS flow to DRB mapping rules and the KgNB and KRRCint keys from the stored UE Inactive AS context except for the following:

masterCellGroup;

mrdc-SecondaryCellGroup, if stored; and pdcp-Config:

1> set the resumeMAC-I to the 16 least significant bits of the MAC-I calculated:

2> over the ASN. 1 encoded as per clause 8 (i.e., a multiple of 8 bits) VarResumeMAC-Input;

2> with the KRRCint key in the UE Inactive AS Context and the previously configured integrity protection algorithm; and 2> with all input bits for COUNT, BEARER and DIRECTION set to binary ones:

1> derive the KgNB key based on the current KgNB key or the NH, using the stored nextHopChainingCount value, as specified in TS 33.501 [11];

1> derive the $K_{RRCenc}$ key, the $K_{RRCint}$ key, the $K_{UPint}$ key and the $K_{UPenc}$ key;

1> configure lower layers to apply integrity protection for all radio bearers except SRB0 using the configured algorithm and the $K_{RRCint}$ key and $K_{UPint}$ key derived in this subclause immediately, i.e., integrity protection shall be applied to all subsequent messages received and sent by the UE;

NOTE 1: Only DRBs with previously configured UP integrity protection shall resume integrity protection.

1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;

1> re-establish PDCP entities for SRB1;

1> resume SRB1;

1> submit the selected message RRCResumeRequest or RRCResumeRequest1 for transmission to lower layers.

NOTE 2: Only DRBs with previously configured UP ciphering shall resume ciphering.

If lower layers indicate an integrity check failure while T319 is running, perform actions specified in 5.3.13.5.

The UE shall continue cell re-selection related measurements as well as cell re-selection evaluation. If the conditions for cell re-selection are fulfilled, the UE shall perform cell re-selection as specified in 5.3.13.6."

Abstract Syntax Notation One (ASN.1) Message Definition According to TS 38.331

RRCResumeRequest Message

As stated in TS 38.331:

The RRCResumeRequest message is used to request the resumption of a suspended RRC connection or perform an RNA update.

Signalling radio bearer: SRB0

Radio Link Control-Service Access Point (RLC-SAP): Transparent Mode (TM)

Logical channel: Common Control Channel (CCCH)

Direction: UE to Network

As shown in Table 1 below, the RRCResumeRequest message comprises a sequence of RRC Resume Request Information Elements (IEs).

TABLE 1

| RRCResumeRequest message | |
| --- | --- |
| RRCResumeRequest ::=    rrcResumeRequest } | SEQUENCE {    RRCResumeRequest-IEs |
| RRCResumeRequest-IEs ::=    resumeIdentity    resumeMAC-I    resumeCause    spare } | SEQUENCE {    ShortI-RNTI-Value,    BIT STRING (SIZE (16)),    ResumeCause,    BIT STRING (SIZE (1)) |

The resumeCause IE provides "the resume cause for the RRC connection resume request as provided by the upper layers or RRC. The network is not expected to reject an RRCResumeRequest due to unknown cause value being used by the UE."

The resumeIdentity IE is a "UE identity to facilitate UE context retrieval at gNB."

The resumeMAC-I IE is an "authentication token to facilitate UE authentication at gNB. The 16 least significant bits of the MAC-I calculated using the AS security configuration as specified in 5.3.13.3 [of TS 38.331]."

RRCResumeRequest1 Message

As stated in TS 38.331:

The RRCResumeRequest1 message is used to request the resumption of a suspended RRC connection or perform an RNA update.

Signalling radio bearer: SRB0

RLC-SAP: TM

Logical channel: CCCH1

Direction: UE to Network

As shown in Table 2 below, the RRCResumeRequest1 message comprises a sequence of RRC Resume Request1 Information Elements (IEs).

TABLE 2

| RRCResumeRequest1 message | |
| --- | --- |
| RRCResumeRequest1 ::= | SEQUENCE { |
| rrcResumeRequest1 | RRCResumeRequest1-IEs |
| } | |
| RRCResumeRequest1-IEs ::= | SEQUENCE { |
| resumeIdentity | I-RNTI-Value, |
| resumeMAC-I | BIT STRING (SIZE (16)), |
| resumeCause | ResumeCause, |
| spare | BIT STRING (SIZE (1)) |
| } | |

The resumeCause IE provides "the resume cause for the RRCResumeRequest1 as provided by the upper layers or RRC. A gNB is not expected to reject an RRCResumeRequest1 due to unknown cause value being used by the UE."

The resumeIdentity IE is a "UE identity to facilitate UE context retrieval at gNB."

The resumeMAC-I IE is an "Authentication token to facilitate UE authentication at gNB. The 16 least significant bits of the MAC-I calculated using the AS security configuration as specified in 5.3.13.3 [of TS 38.331]."

VarResumeMAC-Input

The UE variable "VarResumeMAC-Input" specifies the input used to generate the resumeMAC-I during RRC Connection Resume procedure. Table 3 below illustrates the information elements that comprise the VarResumeMAC-Input.

TABLE 3

| VarResumeMAC-Input variable | |
| --- | --- |
| VarResumeMAC-Input ::= | SEQUENCE { |
| sourcePhysCellId | PhysCellId, |
| targetCellIdentity | CellIdentity, |
| source-c-RNTI | RNTI-Value |
| } | |

The "targetCellIdentity" IE is "An input variable used to calculate the resumeMAC-I. Set to the cellIdentity of the first PLMN-Identity included in the PLMN-Identity InfoList broadcasted in SIB1 of the target cell i.e. the cell the UE is trying to resume."

The "source-c-RNTI" IE is set to "C-RNTI that the UE had in the PCell it was connected to prior to suspension of the RRC connection."

The "sourcePhysCellId" IE is set to "the physical cell identity of the PCell the UE was connected to prior to suspension of the RRC connection."

Security handling at transitions between RRC_INACTIVE and RRC_CONNECTED states:

General:

In 5G, the RRC_INACTIVE state allows gNB/ng-eNB to suspend the UE's RRC connection while the gNB/ng-eNB and the UE continue to maintain the UE 5G AS security context. The UE RRC connection can be resumed at a later time by allowing the UE to transition into RRC_CONNECTED state. The UE may transition from RRC_INACTIVE state to RRC_CONNECTED state to the same last serving gNB/ng-eNB which sent the UE into RRC_INACTIVE state or to a different gNB/ng-eNB. While the UE is in RRC_INACTIVE state, the UE and last serving gNB/ng-eNB store the UE 5G AS security context which can be reactivated when the UE transitions from RRC_INACTIVE to RRC_CONNECTED. The gNB/ng-eNB and the UE shall behave as defined in following sub-clauses. The ng-eNB connected to 5G Core (5GC) shall also support the same security handling at RRC state transitions.

State transition from RRC_CONNECTED to RRC_INACTIVE:

To transition a UE from RRC_CONNECTED to RRC_INACTIVE, a gNB may transmit to the UE a RRCRelease message (with suspend indication suspendConfig) as a result of, for example, the expiration of an inactivity timer. The RRCRelease with suspendConfig message is ciphered and integrity protected in Packet Data Convergence Protocol (PDCP) layer using a current AS security context. The gNB/ng-eNB shall include a fresh Inactive-Radio Network Temporary Identifier (I-RNTI), and a Next Hop Chaining Counter (NCC) in that RRCRelease with suspendConfig message. The I-RNTI is used for context identification, and the UE ID part of the I-RNTI assigned by the gNB/ng-eNB shall be different in consecutive suspends of the same UE. This is to avoid tracking of UEs based on the I-RNTI. If the gNB/ng-eNB has a fresh and unused pair of $\{NCC, NH\}$, the gNB/ng-eNB shall include the NCC in the RRCRelease with suspendConfig message. Otherwise, the gNB/ng-eNB shall include the same NCC associated with the current KgNB in the RRCRelease with suspendConfig message. The NCC is used for AS security.

The gNB/ng-eNB shall delete the current AS keys $K_{RRCenc}$, $K_{UPenc}$ (if available), and $K_{UPint}$ (if available) after sending the RRCRelease with suspendConfig message to the UE, but shall keep the current AS key $K_{RRCint}$. If the sent NCC value is fresh and belongs to an unused pair of $\{NCC, NH\}$ (NH=Next Hop), the gNB/ng-eNB shall save the pair of $\{NCC, NH\}$ in the current UE AS security context and shall delete the current AS key KgNB. If the sent NCC value is equal to the NCC value associated with the current KgNB, the gNB/ng-eNB shall keep the current AS key KgNB and NCC. The gNB/ng-eNB shall store the sent I-RNTI together with the current UE context including the remainder of the AS security context.

Upon receiving the RRC Release with suspendConfig message from the gNB/ng-eNB, the UE shall verify that the integrity of the received RRCRelease with suspendConfig message is correct by checking the PDCP Message Authentication Code (MAC) for Integrity (MAC-I). If this verification is successful, then the UE shall take the received NCC value and save it as stored NCC with the current UE context. The UE shall delete the current AS keys $K_{RRCenc}$, $K_{UPenc}$ (if available), and $K_{UPint}$ (if available), but keep the current AS key $K_{RRCint}$ key. If the stored NCC value is different from the NCC value associated with the current KgNB, the UE shall delete the current AS key KgNB. If the stored NCC is equal to the NCC value associated with the current KgNB, the UE shall keep the current AS key KgNB. The UE shall store the received I-RNTI together with the current UE context including the remainder of the AS security context, for the next state transition.

State transition from RRC_INACTIVE to RRC_CONNECTED to a new gNB/ng-eNB:

When the UE decides to resume the RRC connection to transit from RRC_INACTIVE to RRC_CONNECTED, the UE sends a RRCResumeRequest message on SRB0 and hence it is not integrity protected. However, the RRCResumeRequest message shall include the I-RNTI and a ResumeMAC-I or a shortResumeMAC-I.

The I-RNTI (short or full I-RNTI) is used for context identification and its value shall be the same as the I-RNTI that the UE had received from the source gNB/ng-eNB in the RRCRelease with suspendConfig message.

The ResumeMAC-I/shortResumeMAC-I is a 16-bit message authentication token, the UE shall calculate it using an integrity protection algorithm (Integrity Algorithm for 5G (NIA) or Evolved Packet System Integrity Algorithm (EIA)) in the stored AS security context, which was negotiated between the UE and the source gNB/ng-eNB and the current $K_{RRCint}$ with the following inputs: (1) KEY: it shall be set to current $K_{RRCint}$: (2) BEARER: all its bits shall be set to 1: (3) DIRECTION: its bit shall be set to 1: (4) COUNT: all its bits shall be set to 1: (5) MESSAGE: it shall be set to VarResumeMAC-Input/VarShortInactiveMAC-Input as defined in TS 38.331 for gNB and in TS 36.331 for ng-eNB with following inputs: source Physical Cell Identity (PCI), target Cell-ID, source Cell Radio Network Temporary Identifier (C-RNTI).

For protection of all RRC messages except RRCReject message following the sent RRCResumeRequest message, the UE shall derive a $K_{NG-RAN}$* using the target PCI, target Absolute Radio-Frequency Channel Number—Downlink (ARFCN-DL)/E-UTRA Absolute Radio Frequency Channel Number—Downlink (EARFCN-DL) and the KgNB/NH based on either a horizontal key derivation or a vertical key derivation as defined in clause 6.9.2.1.1 and Annex A.11/ Annex A.12 of 3GPP TS 33.501, e.g. V16.7.0. The UE shall further derive $K_{RRCint}$, $K_{RRCenc}$, $K_{UPenc}$ (optionally), and $K_{UPint}$ (optionally) from the newly derived $K_{NG-RAN}$*.

When the target gNB/ng-eNB receives the RRCResumeRequest message from the UE, the target gNB/ng-eNB extracts the I-RNTI from the RRCResumeRequest message. The target gNB/ng-eNB contacts the source gNB/ng-eNB based on the information in the I-RNTI by sending an Xn-AP Retrieve UE Context Request message with the following included: I-RNTI, the ResumeMAC-I/shortResumeMAC-I and target Cell-ID, in order to allow the source gNB/ng-eNB to validate the UE request and to retrieve the UE context including the UE 5G AS security context.

The source gNB/ng-eNB retrieves the stored UE context including the UE 5G AS security context from its database using the I-RNTI. The source gNB/ng-eNB verifies the ResumeMAC-I/shortResumeMAC-I using the current $K_{RRCint}$ key stored in the retrieved UE 5G AS security context (calculating the ResumeMAC-I/shortResumeMAC-I in the same way as described above). If the verification of the ResumeMAC-I/shortResumeMAC-I is successful, then the source gNB/ng-eNB calculates $K_{NG-RAN}$* using the target PCI, target ARFCN-DL/EARFCN-DL and the KgNB/NH in the current UE 5G AS security context based on either a horizontal key derivation or a vertical key derivation according to whether the source gNB/ng-eNB has an unused pair of {NCC, NH} as described in Annex A.11/Annex A.12. The source gNB/ng-eNB can obtain the target PCI and target ARFCN-DL/EARFCN-DL from a cell configuration database by means of the target Cell-ID which was received from the target gNB/ng-eNB. Then the source gNB/ng-eNB shall respond with an Xn-AP Retrieve UE Context Response message to the target gNB/ng-eNB including the UE context that contains the UE 5G AS security context. The UE 5G AS security context sent to the target gNB/ng-eNB shall include the newly derived $K_{NG-RAN}$*, the NCC associated to the $K_{NG-RAN}$*, the UE 5G security capabilities, User Plane (UP) security policy, the UP security activation status with the corresponding Protocol Data Unit (PDU) session ID(s), and the ciphering and integrity protection algorithms used by the UE with the source cell.

The target gNB/ng-eNB shall check if it supports the ciphering and integrity protection algorithms the UE used with the last source cell. If the target gNB/ng-eNB does not support the ciphering and integrity protection algorithms used in the last source cell or if the target gNB/ng-eNB prefers to use different algorithms than the source gNB/ng-eNB, then the target gNB/ng-eNB shall send an RRC Setup/RRCSetup message on SRB0 to the UE in order to proceed with RRC connection establishment as if the UE was in RRC_IDLE (i.e., a fall-back procedure).

If the target gNB/ng-eNB supports the ciphering and integrity protection algorithms used with the last source cell and these algorithms are the chosen algorithms by the target gNB/ng-eNB, the target gNB/ng-eNB shall derive new AS keys (RRC integrity key, RRC encryption key and UP keys) using the algorithms the UE used with the source cell and the received $K_{NG-RAN}$*. The target gNB/ng-eNB shall reset all PDCP COUNTs to 0 and activate the new keys in PDCP layer. The target gNB/ng-eNB shall respond to the UE with an RRC Resume message on SRB1 which is integrity protected and ciphered in PDCP layer using the new RRC keys.

If the UP security activation status can be supported in the target gNB/ng-eNB, the target gNB/ng-eNB shall use the UP security activations that the UE used at the last source cell. Otherwise, the target gNB/ng-eNB shall respond with an RRC Setup message to establish a new RRC connection with the UE. When the UE receives the RRCResume message, the UE shall decrypt the message using the $K_{RRCenc}$ that was derived based on the newly derived $K_{NG-RAN}$*. The UE shall also verify the <RRC Connection Resume> message by verifying the PDCP MAC-I using the $K_{RRCint}$ that was derived from the newly derived $K_{NG-RAN}$* If verification of the RRCResume message is successful, the UE shall delete the current $K_{RRCint}$ key and the UE shall save the $K_{RRCint}$, $K_{RRCenc}$, $K_{UPenc}$ (optionally), and $K_{UPint}$ (optionally) from the newly derived $K_{NG-RAN}$* as part of the UE current AS security context. In this case, the UE shall send the RRCResumeComplete message both integrity protected and ciphered to the target gNB/ng-eNB on SRB1 using the current $K_{RRCint}$ and $K_{RRCenc}$. The UE shall use the UP security activations that were used before transition to the RRC Inactive.

If the UE receives RRCReject message from the target gNB/ng-eNB in response to the UE<RRC Resume Request> message, the UE shall delete newly derived AS keys used for connection resumption attempt, including newly derived $K_{NG-RAN}$*, newly derived RRC integrity key, RRC encryption key and UP keys, and keep the current $K_{RRCint}$ and the KgNB/NH in its current AS context.

Security is fully resumed on UE side after reception and processing of RRCResume message. The UE can receive data on DRB(s) after having received and processed RRC connection resume message. Uplink (UL) data on DRB(s) can be sent after RRCResumeComplete message has been successfully sent.

After a successful transition from RRC_INACTIVE to RRC_CONNECTED the target gNB/ng-eNB shall perform Path Switch procedure with the access and mobility management function (AMF). The AMF shall verify the UE security capability as described in the clause 6.7.3.1 of TS 33.501, and the SMF shall verify the UE's UP security policy as described in the clause 6.6.1 of TS 33.501.

SUMMARY

Certain challenges presently exist. For instance, the RRCResumeRequest message is a message that is sent unprotected. For example, currently, the resume cause field in the RRCResumeRequest message is not protected by the ResumeMAC-I token. This means that the integrity of the resume cause field in the RRCResumeRequest message is not provided nor integrity protected. Therefore, a Man-in-the-Middle (MiTM) attack by a false base station is possible by modifying the resume cause from one value to another. This attack could reduce the type of service offered by the network to the UE. In addition, since in 5G, "rna-Update" was added as another value of the resume cause field, if an attacker modifies the resume cause field value from "emergency" to "rna-Update," then the network will not be able to detect the tampering, and, not only that, but the network will immediately send the UE back to INACTIVE while the UE is waiting to establish an emergency call, for example.

In addition, in the case when a UE initiates RRC Resume procedure, the UE sends RRCResumeRequest which include ResumeMAC-I that is based on the old Krreint and it includes the I-RNTI amongst other parameters. If a new 5G base station (gNB) is busy, it usually sends RRCReject with a wait timer.

When the UE receives the RRCReject message, it goes back to INACTIVE and retries one more time after the wait timer expires. When the UE retries, it is supposed to use the same I-RNTI and the same old Krrcint key. This means that the second RRCResumeRequest message is exactly the same as the original one before the RRCReject. Thus, a MiTM false base station that is able to capture the first RRCResumeRequest message can possibly send the message to the new gNB before the UE wait timer expires and the old gNB will successfully validate the ResumeMAC-I as a valid one and will transfer the UE context to the new gNB. If the UE tries the resume procedure once again, the new target gNB will fail to allocate the UE context and thus the resume procedure will fail.

Therefore, it is important that the 5G system support a mechanism that avoids the replay of RRCResumeRequest message after the UE receives an RRCReject. This is also highlighted in a Liaison Statement (LS) published in a 3GPP document S3-212349 where the following is stated:

There is one solution #17 proposing to protection RRCResumeRequest message. In this solution, when the UE initiates the RRC Resume procedure, the UE should use the whole RRCResumeRequest message, except the ResumeMAC-I/shortResumeMAC-I, as an additional input parameter to the VarResumeMac-Input part in order to calculate ResumeMAC-I/shortResume-MAC-I. The UE should send the calculated Resume-MAC-I/shortResumeMAC-I in the RRCResumeRequest message. The UE and the network negotiate/learn each other's capability/support of using the newer version of ResumeMAC-I/shortResumeMAC-I as below:

UE's capability is part of an RRC message (i.e., AS Security Mode Complete (SMComplete) message).
gNB/ng-eNB's capability is part of a System Information (SI) message (i.e., SIB1, refer to a closely related feature called useFullResumeID in SIB1).
A solution under consideration, needs to handle the backward incompatibility issue if the target gNBs (Rel-15/Rel-16) capability is not in line with the UE and the source gNB, the UE and the source gNB will not be aware of the capability of the target gNB. Therefore, the ResumeMAC-I/ShortResumeMAC-I verification may fail, as the Rel-15/Rel-16 target gNB will send limited parameters instead of entire RRCResumeRequest message to the source gNB, which will not be sufficient for the source gNB to calculate the Resume-MAC-I/shortResumeMAC-I for verification.

An object of the invention is to improve security in a wireless communication network with respect to RRC signalling, in particular by avoiding or at least mitigating a MiTM false base station attack related to a RRCResumeRequest message sent by a UE.

In one aspect there is provided a method for generating an authentication token. In one embodiment the method includes obtaining (e.g., generating, receiving, retrieving) a first connection resume request message (e.g., RRCResumeRequest or RRCResumeRequest1) that comprises: i) a first field (e.g., resume cause field) containing a cause value, ii) a second field (e.g., a resume identity field) containing an identity value, and iii) a third field (e.g., a token field such as the ResumeMAC-I field) containing a pre-defined token value (e.g., all 0s or all 1s or etc.). The method also includes using the first connection resume request message to generate an authentication token.

In another embodiment, the method for generating the authentication token includes obtaining a first connection resume request message that comprises a first field/resume cause field containing a cause value and a second field/resume identity field containing an identity value, but the first connection resume request message does not include any token field (e.g., a ResumeMAC-I field). The method also includes using the first connection resume request message to generate an authentication token.

In another embodiment, the method for generating the authentication token includes obtaining a first connection resume request message that comprises: i) a resume cause field containing a cause value, ii) a resume identity field containing an identity value, and iii) a token field having a first type (e.g., "NULL" type). The method also includes using the first connection resume request message to generate an authentication token.

In another aspect there is provided a computer program comprising instructions which when executed by processing circuitry of a UE causes the UE to perform any of the UE methods disclosed herein. In one embodiment, there is provided a carrier containing the computer program wherein the carrier is one of an electronic signal, an optical signal, a radio signal, and a computer readable storage medium.

In another aspect there is provided a computer program comprising instructions which when executed by processing circuitry of a network node/network device causes the network node/device to perform any of the network node/device methods disclosed herein. In one embodiment, there is provided a carrier containing the computer program wherein the carrier is one of an electronic signal, an optical signal, a radio signal, and a computer readable storage medium.

In another aspect there is provided a UE that is configured to perform the UE methods disclosed herein. The UE may include memory and processing circuitry coupled to the memory.

In another aspect there is provided a network node/device that is configured to perform the network node/device methods disclosed herein. The network node/device may include memory and processing circuitry coupled to the memory.

An advantage of the embodiments disclosed herein is that they reduce the likelihood of a MiTM false base station attack when a UE sends an RRCResumeRequest message. Additionally, embodiments disclosed herein reduce the likelihood that the validation of the resumeMAC-I will fail.

BRIEF DESCRIPTION OF THE DRAWINGS

The accompanying drawings, which are incorporated herein and form part of the specification, illustrate various embodiments.

FIG. 10 is a flowchart illustrating a process according to some embodiments.

FIG. 11 is a flowchart illustrating a process according to some embodiments.

FIG. 12 is a flowchart illustrating a process according to some embodiments.

FIG. 13 is a flowchart illustrating a process according to some embodiments.

FIG. 14 is a flowchart illustrating a process according to some embodiments.

FIG. 15 is a flowchart illustrating a process according to some embodiments.

FIG. 16 is a flowchart illustrating a process according to some embodiments.

FIG. 17 is a flowchart illustrating a process according to some embodiments.

FIG. 18 is a flowchart illustrating a process according to some embodiments.

FIG. 19 is a flowchart illustrating a process according to some embodiments.

DETAILED DESCRIPTION

This disclosure aims at avoiding or at least mitigating MiTM false base station attacks when a UE sends an RRCResumeRequest message. Additionally, this disclosure describes a coordination mechanism in order to inform the source gNB (when the UE transits from RRC_INACTIVE to RRC_CONNECTED) on whether or not the target gNB supports the new mechanisms proposed herein. This will avoid the validation of the resumeMAC-I from failing which would otherwise require the UE to setup the RRC connection from scratch.

The embodiments disclosed herein are exemplified in the context of NR, but the embodiments are not limited to NR and can also be applied to Long Term Evolution (LTE) and the use of gNB for a base station could alternatively be said to be an eNodeB (eNB). It is also envisioned that the invention would be applicable also to future networks, such as a future 6th generation 3GPP network. Additionally, the embodiments are based on the RRCResumeRequest message, but the same embodiments can also be used for the RRCResumeRequest1 message.

Figure 1:
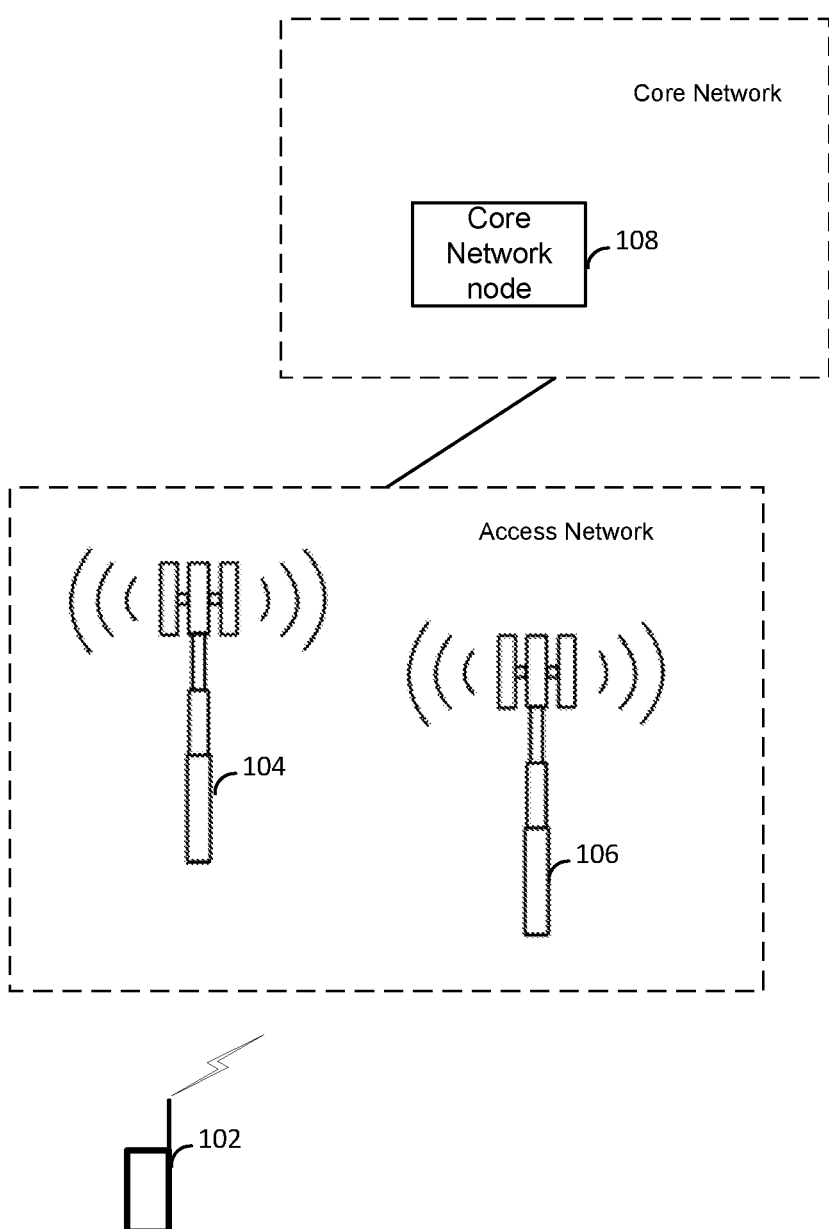
FIG. 1 illustrates a network according to some embodiments.

FIG. 1 illustrates a network 100 comprising a UE 102, a first network node/network device 104 (e.g., a first gNB or eNB), a second network node 106 (e.g., a second gNB or eNB), and a third network node 108 (e.g., an Access and Mobility Function (AMF) or a Mobility Management Entity (MME)). A UE is any communication device capable of communicating with a network node (e.g., base station) of an access network. Examples of the UE include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device/telematics unit, a connected vehicle itself etc. . . . A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot.

In this example, first and second network nodes 104 and 106 are network nodes of an access network (e.g., a radio access network (RAN)) of the network 100 and third network node 108 is a network node of a core network of the network 100. Also in this example, UE 102 has been released to RRC_INACTIVE by the first network node 104 (a.k.a., "gNB1"), and, at a later point in time, the UE attempts to transition from RRC_INACTIVE to RRC_CONNECTED towards the second network node 106 (a.k.a., "gNB2") by transmitting a connection resume request message.

Figures 2, 3:
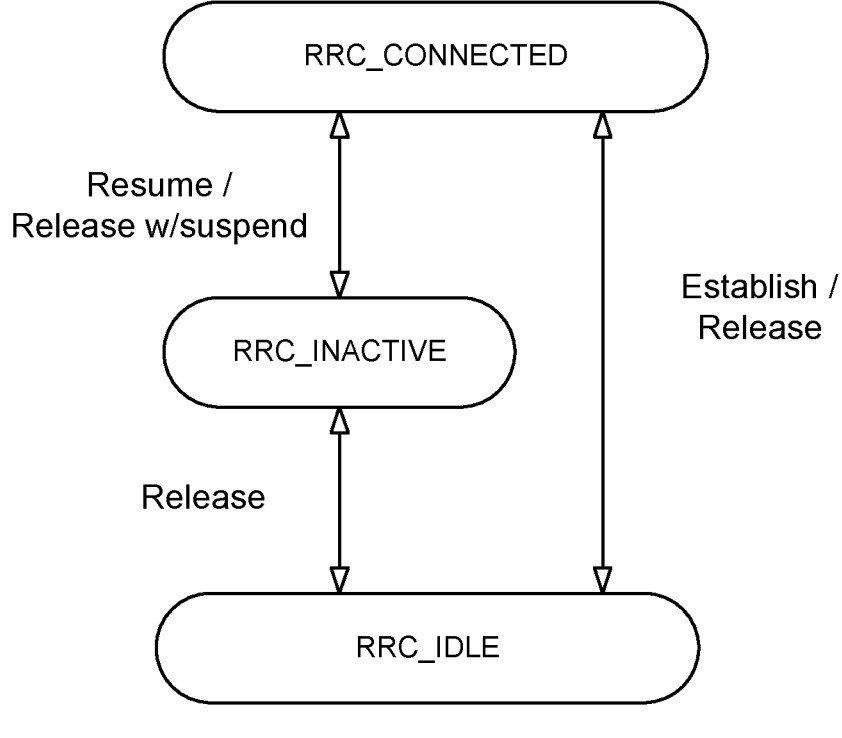
FIG. 2 illustrates a UE state transition diagram.
FIG. 3 illustrates a gNB suspending a UE's RRC connection.

RRC connection resume is available in NR and enhanced Long Term Evolution (eLTE). In particularly, the RRC state model is updated in NR (and in eLTE, i.e. LTE connected to the 5G Core, 5GC) as illustrated in FIG. 2 and a new RRC_INACTIVE state is introduced in addition to the existing RRC_IDLE and RRC_CONNECTED states inherited from LTE. In RRC_INACTIVE, the UE context from the previous RRC connection is stored in the radio access network (RAN) and is re-used the next time an RRC connection is established. The UE context includes information such as the UE security configuration, configured radio bearers etc. By storing the UE context in the RAN, one avoids the signaling required for security activation and bearer establishment which is normally required when transitioning from RRC_IDLE to RRC_CONNECTED. This improves latency and reduces the signaling overhead.

RRC_INACTIVE mode is realized by introducing two new procedures "RRC connection suspend" (also called RRC connection release with SuspendConfig) and "RRC connection resume." The gNB suspends a connection and moves the UE from RRC_CONNECTED to RRC_INAC-TIVE by sending a RRC release message with suspend indication (or configuration) to UE 102, as illustrated in FIG. 3. This may happen for example after the UE has been inactive for a certain period which causes a gNB internal inactivity timer to expire. Both the UE and gNB store the UE context and the associated identifier (here referred to as I-RNTI). It has been recently updated that two identifiers will be configured in the suspend configuration, a long I-RNTI and short I-RNTI. The one to be used in resume depends on an indication from the network in system information of the cell in which the UE tries to resume. The two I-RNTI identifiers were introduced to support scenarios when the UE is resuming in a cell which only gives the UE a small scheduling grant for the first uplink (UL) message. For this purpose, also two different resume messages have been introduced namely RRCResumeRequest and RRCRe-sumeRequest1. However, "RRC resume request" is used herein to refer to both messages.

At the next transition to RRC_CONNECTED, the UE resumes the connection by sending to the gNB which the UE attempts to resume the connection towards (note that it may be another cell/gNB compared to the cell/gNB where the connection was suspended) a connection resume request message (referred to herein as "RRC resume request") including the following information: 1) the I-RNTI (either the long or short I-RNTI depending on the system informa-tion indication): 2) an authentication token (a MAC called resumeMAC-I in 3GPP terminology) which is used to identify and verify the UE at RRC connection resume; and 3) an indication of the cause of the resume, e.g. mobile originated data.

Figure 4:
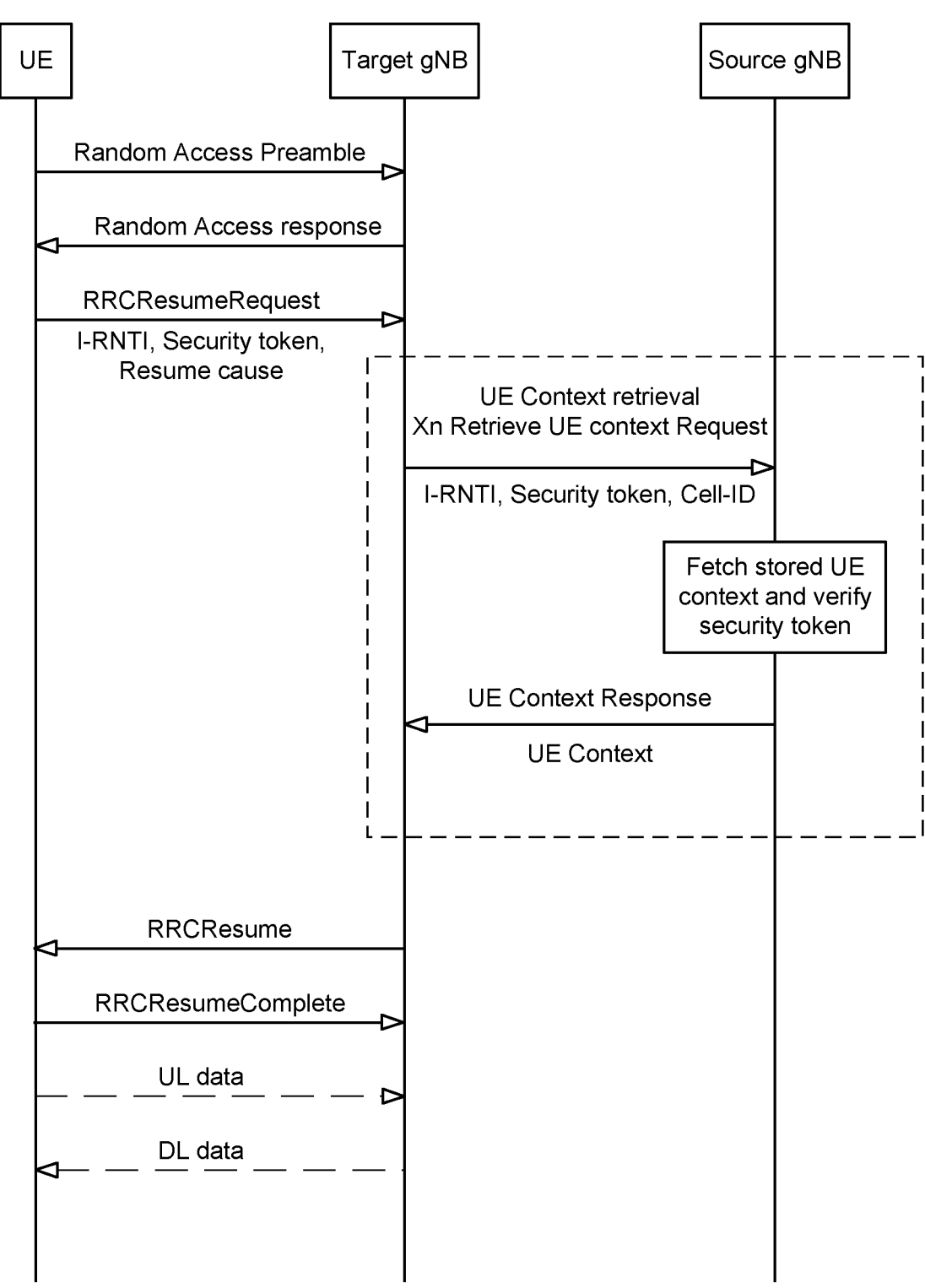
FIG. 4 is a message flow diagram illustrating a process according to some embodiments.

The gNB which serves the cell in which the UE is resuming is sometimes referred to as the target gNB, while the gNB serving the cell in which the UE was suspended is sometimes referred to as the source gNB. To resume the UE's connection, the target gNB determines which gNB is the source gNB (considering the gNB part of the I-RNTI) and retrieves the UE's context from the source gNB (e.g., the target gNB transmits to the source gNB a UE context request message requesting the context for the UE). In the request the target provides, among other things, the UE ID and security token received from the UE as well as the target cell Cell ID. This is illustrated in FIG. 4.

The source gNB then locates the UE context based on the I-RNTI and verifies the request based on the security token. If successful, the source gNB forwards the UE context to the target gNB, which then responds to the UE with RRC resume to confirm that the connection is being resumed. The RRC resume message may also contain configurations to reconfigure the radio bearers being resumed. Finally, the UE acknowledges the reception of the RRC re-establishment by sending RRC re-establishment complete.

The described NR RRC resume procedure works in a similar way in LTE (even though in the state model the UE is considered in RRC_IDLE with a stored context) and eLTE (i.e. when LTE is connected to 5GC).

In NR and in eLTE (LTE connected to 5GC) the RRCRe-sume message in response to an RRCResumeRequest is encrypted and integrity protected. That is done using new security keys, derived based on the stored AS security context. This new key derivation (sort of a key update) is done as part of the resume procedure, in particular as part of the transmission of the RRCResumeRequest (or RRCRe-sumeRequest1).

It is not only the RRCResume message that may be sent in response to the RRCResumeRequest message. In NR and eLTE, after the UE sends an RRC Resume Request kind of message (e.g. RRCResumeRequest or RRCResumeR-equest1) the UE may receive a message on Signaling Radio Bearer #1 (SRB1) that should also be encrypted, and integ-rity protected, as described above:

RRCRelease with suspend configuration moving the UE to RRC_INACTIVE;

RRCRelease without suspend configuration moving the UE to RRC_IDLE;

RRCResume moving the UE to RRC_CONNECTED.

Figure 5:
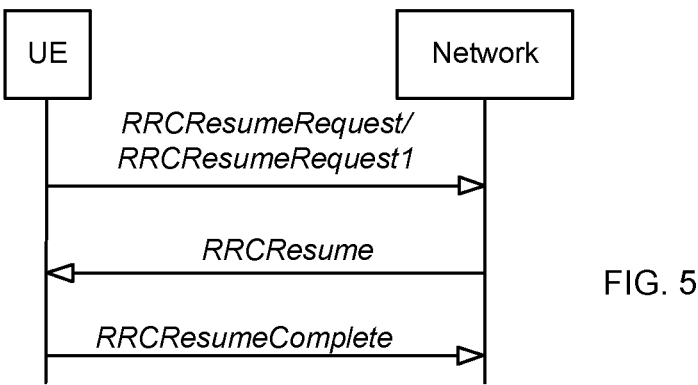
FIG. 5 illustrates signaling in relation to a successful RRC resume.
Figure 6:
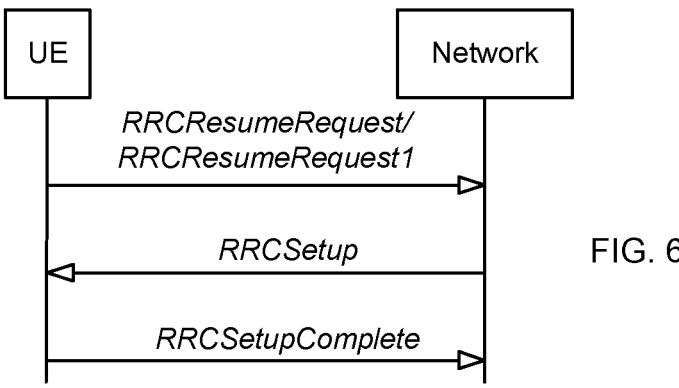
FIG. 6 illustrates successful RRC connection resume fallback to RRC connection establishment.
Figure 7:
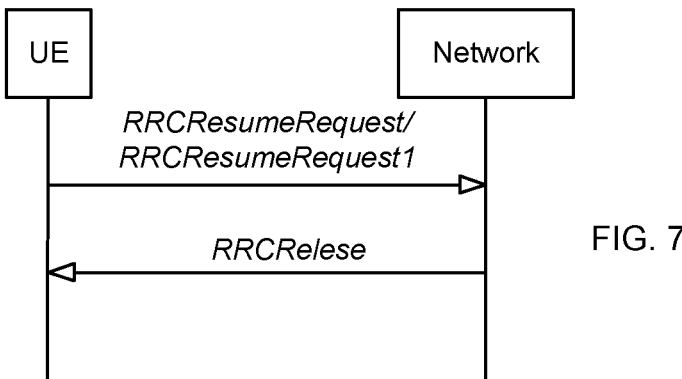
FIG. 7 illustrates successful RRC connection resume followed by network release.
Figure 8:
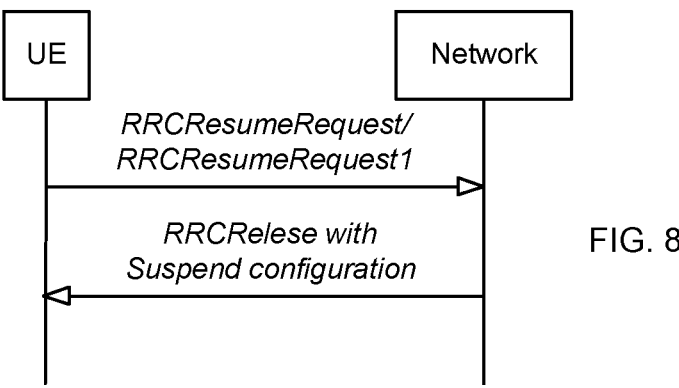
FIG. 8 illustrates a successful RRC connection resume followed by network suspend.
Figure 9:
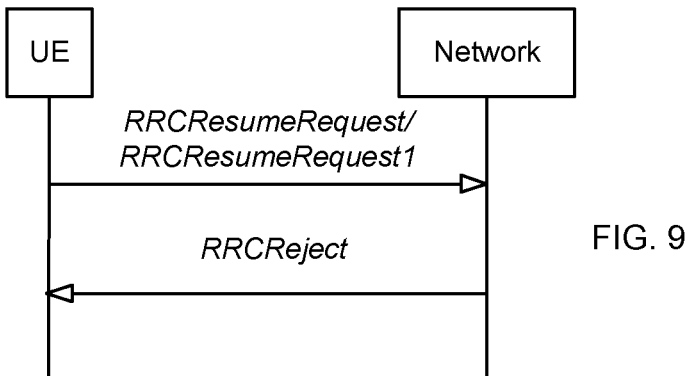
FIG. 9 illustrates an RRC connection resume request from the UE followed by a rejection from the network.

Other messages may also be transmitted, an RRCReject with wait timer or RRCSetup (fallback to RRC_IDLE) but on SRB0 (i.e. not encrypted or integrity protected). All these possible responses are shown as follows: FIG. 5 illustrates signalling in relation to a successful RRC resume: FIG. 6 illustrates successful RRC connection resume fallback to RRC connection establishment; FIG. 7 illustrates successful RRC connection resume followed by network release: FIG. 8 illustrates a successful RRC connection resume followed by network suspend; and FIG. 9 illustrates an RRC connec-tion resume request from the UE followed by a rejection from the network.

A. How the UE Calculate the New ResumeMAC-I/shortRe-sumeMAC-I

When the UE 102 initiates the RRC resume procedure, the UE generates an RRCResumeRequest message and trans-mits the RRCResumeRequest message to a gNB (e.g., gNB2 in this example). As described above, to generate the RRCResumeRequest message the UE needs to generate the authentication token (i.e., generate/calculate the Resume-MAC-I or the shortResumeMAC-I). As further described above, to generate the authentication token the UE uses an integrity protection algorithm (NIA or EIA, e.g. 128-NIA1, 128-NIA2) indicated in the stored AS security context and the following inputs to the integrity protection algorithm: (1) a KEY: that is set to current $K_{RRCint}$: (2) a BEARER (all its bits shall be set to 1): (3) a DIRECTION (all its bit shall be set to 1): (4) a COUNT (all its bits shall be set to 1); and (5) VarResumeMAC-Input (or VarShortInactiveMAC-Input).

In one embodiment, the VarResumeMAC-Input (or Var-ShortInactiveMAC-Input) that is used to generate the authentication token comprises or consists of: i) the value of resumeCause IE which will be included in the RRCResum-eRequest to be sent by the UE to the gNB and ii) the value of the resumeIdenity IE which will be included in the RRCResumeRequest to be sent by the UE to the gNB. In some embodiments, however, the VarResumeMAC-Input (or VarShortInactiveMAC-Input) further comprises: iii) a pre-defined, initial value for ResumeMAC-I/shortResume-MAC-I (e.g., a bit string of all 0s or all 1s or some other pre-defined bit string).

In other words, in one embodiment, the UE includes at least part of one or more RRCResumeRequest messages in the UE variable VarResumeMac-Input to calculate the ResumeMAC-I/shortResumeMAC-I. In one embodiment, an entire initial RRCResumeRequest message is included in the UE variable VarResumeMac-Input within a container (i.e., OCTET STRING). Since the final RRCResumeR-equest message that is ultimately sent by the UE to the gNB includes the calculated ResumeMAC-I/shortResumeMAC-I fields, in order to avoid any wrong behavior on the UE and network side on how to fill in these field, at least one (or a combination) of the following options can be applied.

Option 1

The UE 102 when including the initial RRCResumeRequest messages in a container (i.e., OCTET STRING) in the UE variable VarResumeMac-Input, it sets the fields ResumeMAC-I/shortResumeMAC-I of the RRCResumeRequest message to an initial value, for example, a bit string of zeros or ones or any predefined value. After the fields ResumeMAC-I/shortResumeMAC-I are calculated by the UE, then the fields ResumeMAC-I/shortResumeMAC-I are set to the calculated value, thereby the initial RRCResumeRequest message is transformed into the final RRCResumeRequest message that is sent to the gNB.

Option 2

The UE 102 when including the initial RRCResumeRequest messages in a container (i.e., OCTET STRING) in the UE variable VarResumeMac-Input, the initial RRCResumeRequest does not include the fields ResumeMAC-I/shortResumeMAC-I. This means that the fields ResumeMAC-I/shortResumeMAC-I are only included in the final RRCResumeRequest message after it has been calculated based on the UE variable VarResumeMac-Input. This means that the fields ResumeMAC-I/shortResumeMAC-I in the RRCResumeRequest message are made optional rather than mandatory. This optionality is to enable ASN.1 compliant encoding for calculation of ResumeMAC-I/shortResumeMAC-I. For the final RRCResumeRequest message that the UE sends to the network, it will remain mandatory.

Option 3

The fields ResumeMAC-I/shortResumeMAC-I within the RRCResumeRequest messages are declared in the specification with two possible types. One type, that is also the current one, is "bit string", and the other one is "null". Therefore, when the UE sends the RRCResumeRequest messages to the network with the fields ResumeMAC-I/shortResumeMAC-I it uses the type "bit string" (as it is now in legacy), but when the UE uses the RRCResumeRequest messages in the UE variable VarResumeMac-Input to calculate the fields ResumeMAC-I/shortResumeMAC-I it uses the type "null" for the fields ResumeMAC-I/shortResumeMAC-I within the UE variable VarResumeMac-Input.

Accordingly, in one option, the UE initiates the RRC resume procedure and includes all the fields of the RRCResumeRequest messages, except for the fields ResumeMAC-I/shortResumeMAC-I, in the UE variable VarResumeMac-Input to calculate the ResumeMAC-I/shortResumeMAC-I. This means that a new structure is created in the UE variable VarResumeMac-Input where the fields of the RRCResumeRequest messages, except for the fields ResumeMAC-I/shortResumeMAC-I, are included.

Implementation Examples

In one example, the VarResumeMAC-Input variable is defined as shown in Table 4 below.

TABLE 4

| VarResumeMAC-Input variable | |
| --- | --- |
| VarResumeMAC-Input-r17 ::= | SEQUENCE { |
| sourcePhysCellId | PhysCellId, |
| targetCellIdentity | CellIdentity, |
| source-c-RNTI | RNTI-Value |
| rrcResumeRequest | CHOICE { |
| rrcResumeReq | OCTET STRING, |
| rrcResumeReq1 | OCTET STRING |
| } OPTIONAL | |
| } | |

The rrcResumeRequest IE is an input variable that includes an entire initial RRCResumeRequest message. The field rrcResumeReq is used to include the initial RRCResumeRequest message while the field rrcResumeReq1 is used to include the initial RRCResumeRequest1 message. The UE shall set the field resumeMAC-I within rrcResumeReq or rrcResumeReq1 to a bit string of zeros when including the RRCResumeRequest or RRCResumeRequest1 message.

In another example, the VarResumeMAC-Input variable is defined as shown in Table 5 below.

TABLE 5

| VarResumeMAC-Input variable | |
| --- | --- |
| VarResumeMAC-Input-r17 ::= | SEQUENCE { |
| sourcePhysCellId | PhysCellId, |
| targetCellIdentity | CellIdentity, |
| source-c-RNTI | RNTI-Value |
| resumeIdentity | ShortI-RNTI-Value, |
| resumeCause | ResumeCause, |
| } | |

The resumeCause IE is an input variable used to calculate the resumeMAC-I that provides the resume cause for the RRC connection resume request as provided by the upper layers or RRC. The resumeIdentity IE is an input variable used to calculate the resumeMAC-I and that provide the UE identity to facilitate UE context retrieval at gNB.

B. UE and Network Capability Indication of the New ResumeMAC-I/shortResumeMAC-I Calculation In one embodiment, the UE indicates to the network whether or not the UE supports the new calculation for the fields ResumeMAC-I/shortResumeMAC-I. In order to do so, the UE can use at least one (or a combination) of the following options to indicate to the network that it supports (or not) the new calculation for the fields ResumeMAC-I/shortResumeMAC-I.

Option 1:

The UE includes an indication on whether it supports (or not) the new calculation for the fields ResumeMAC-I/shortResumeMAC-I within the RRCResumeRequest message. For example, a new field of type BOOLEAN that, if present, indicates the new calculation.

Option 2:

The UE includes an indication on whether it supports (or not) the new calculation for the fields ResumeMAC-I/shortResumeMAC-I within a UECapability Information message.

Option 3:

The UE includes an indication on whether it supports (or not) the new calculation for the fields ResumeMAC-I/shortResumeMAC-I in a new uplink dedicated RRC message (that is sent to the network via before sending the RRCResumeRequest message).

Option 4:

The UE provides an indication on whether it supports (or not) the new calculation for the fields ResumeMAC-I/shortResumeMAC-I to a core network function like the AMF. For example, UE can provide the indication as UE's network or security capability to AMF in a NAS message (like Registration Request). Then, the AMF provides the UE's indication to the radio access network function like gNB.

In another embodiment, the network indicates to the UE whether it supports (or not) the new calculation for the fields ResumeMAC-I/shortResumeMAC-I. In order to do so, the network can use at least one (or a combination) of the following options to indicate to the network that it supports (or not) the new calculation for the fields ResumeMAC-I/ shortResumeMAC-I:

Option 1:

The network includes an indication on whether it supports (or not) the new calculation for the fields ResumeMAC-I/ shortResumeMAC-I within a system information block (SIB) that is sent to the UE via broadcast, or via dedicated signalling. A possible SIB candidate on where to include such indication can be the SIB1 but can also be any other SIB(s) that can be received by the UE or a totally new SIB created for this purpose.

Option 2:

The network includes an indication on whether it supports (or not) the new calculation for the fields ResumeMAC-I/ shortResumeMAC-I within an existing DL RRC dedicated message. Possible candidate DL RRC dedicated message can be the RRCRelease, the RRCReconfiguration, or the DLInformation Transfer.

Option 3:

The network includes an indication on whether it supports (or not) the new calculation for the fields ResumeMAC-I/ shortResumeMAC-I within a new Medium Access Control Control Element (MAC-CE) or a new Downlink Control Information (DCI) format.

In one embodiment, the network can use the indication that is sent to the UE to indicate the support of the new calculation for the fields ResumeMAC-I/shortResume-MAC-I as a means to turn on or off this feature. In fact, the network may use this indication to indicate to the UE whether to use the new calculation or the old one.

In another embodiment, the indication sent by the UE or by the network is a one-bit indication where "1" means the support of the new calculation for the fields ResumeMAC-I/shortResumeMAC-I and "0" that the new calculation for the fields ResumeMAC-I/shortResumeMAC-I is not supported, or vice versa. Further, in another embodiment, the indication sent by the UE or by the network is a Boolean value where "true" means the support of the new calculation for the fields ResumeMAC-I/shortResumeMAC-I and "false" that the new calculation for the fields ResumeMAC-I/shortResumeMAC-I is not supported, or vice versa. Yet, in another embodiment, the indication is just a field (what type it is does not matter) whether just the presence of this field means the support of the new calculation for the fields ResumeMAC-I/shortResumeMAC-I and the absence of this field that the new calculation for the fields ResumeMAC-I/ shortResumeMAC-I is not supported.

Implementation Examples

The IE UE-NR-Capability is used to convey the NR UE Radio Access Capability Parameters, see 3GPP TS 38.306, e.g. V 16.5.0. In one embodiment, the UE-NR-Capability information element is defined as shown in Table 6 below.

TABLE 6

| UE-NR-Capability IE | |
| --- | --- |
| UE-NR-Capability ::= | SEQUENCE { |
| accessStratumRelease | AccessStratumRelease, |
| pdcp-Parameters | PDCP-Parameters, |
| rlc-Parameters | RLC-Parameters |
| OPTIONAL, | |
| mac-Parameters | MAC-Parameters |
| OPTIONAL, | |
| phy-Parameters | Phy-Parameters, |
| rf-Parameters | RF-Parameters, |
| measAndMobParameters | MeasAndMobParameters |
| OPTIONAL, | |
| fdd-Add-UE-NR-Capabilities | UE-NR-CapabilityAddXDD-Mode |
| OPTIONAL, | |
| tdd-Add-UE-NR-Capabilities | UE-NR-CapabilityAddXDD-Mode |
| OPTIONAL, | |
| fr1-Add-UE-NR-Capabilities | UE-NR-CapabilityAddFRX-Mode |
| OPTIONAL, | |
| fr2-Add-UE-NR-Capabilities | UE-NR-CapabilityAddFRX-Mode |
| OPTIONAL, | |
| featureSets | FeatureSets |
| OPTIONAL, | |
| featureSetCombinations | SEQUENCE (SIZE |
| (1..maxFeatureSetCombinations)) OF FeatureSetCombination | |
| OPTIONAL, | |
| lateNonCriticalExtension | OCTET STRING (CONTAINING UE-NR- |
| Capability-v15c0) | OPTIONAL, |
| nonCriticalExtension | UE-NR-Capability-v1530 |
| OPTIONAL | |
| } | |
| -- Regular non-critical extensions: | |
| UE-NR-Capability-v1530 ::= | SEQUENCE { |
| fdd-Add-UE-NR-Capabilities-v1530 | UE-NR-CapabilityAddXDD- |
| Mode-v1530 | OPTIONAL, |
| tdd-Add-UE-NR-Capabilities-v1530 | UE-NR-CapabilityAddXDD- |
| Mode-v1530 | OPTIONAL, |
| dummy | ENUMERATED {supported} |
| OPTIONAL, | |
| interRAT-Parameters | InterRAT-Parameters |
| OPTIONAL, | |
| inactiveState | ENUMERATED {supported} |
| OPTIONAL, | |
| delayBudgetReporting | ENUMERATED {supported} |

TABLE 6-continued

| UE-NR-Capability IE |
|---|

```
OPTIONAL,
    nonCriticalExtension                        UE-NR-Capability-v1540
OPTIONAL
}
UE-NR-Capability-v1540 ::=               SEQUENCE {
    sdap-Parameters                             SDAP-Parameters
OPTIONAL,
    overheatingInd                              ENUMERATED {supported}
OPTIONAL,
    ims-Parameters                              IMS-Parameters
OPTIONAL,
    fr1-Add-UE-NR-Capabilities-v1540            UE-NR-CapabilityAddFRX-
Mode-v1540                                  OPTIONAL,
    fr2-Add-UE-NR-Capabilities-v1540            UE-NR-CapabilityAddFRX-
Mode-v1540                                  OPTIONAL,
    fr1-fr2-Add-UE-NR-Capabilities              UE-NR-CapabilityAdd FRX-
Mode                                       OPTIONAL,
    nonCriticalExtension                        UE-NR-Capability-v1550
OPTIONAL
}
UE-NR-Capability-v1550 ::=               SEQUENCE {
    reducedCP-Latency                           ENUMERATED {supported}
OPTIONAL,
    nonCriticalExtension                        UE-NR-Capability-v1560
OPTIONAL
}
UE-NR-Capability-v1560 ::=               SEQUENCE {
    nrdc-Parameters                             NRDC-Parameters
OPTIONAL,
    receivedFilters                             OCTET STRING (CONTAINING
UECapabilityEnquiry-v1560-IEs)          OPTIONAL,
    nonCriticalExtension                        UE-NR-Capability-v1570
OPTIONAL
}
UE-NR-Capability-v1570 ::=               SEQUENCE {
    nrdc-Parameters-v1570                       NRDC-Parameters-v1570
OPTIONAL,
    nonCriticalExtension                        UE-NR-Capability-v1610
OPTIONAL
}
-- Late non-critical extensions:
UE-NR-Capability-v15c0 ::=               SEQUENCE {
    nrdc-Parameters-v15c0                       NRDC-Parameters-v15c0
OPTIONAL,
    partialFR2-FallbackRX-Req                   ENUMERATED {true}
OPTIONAL,
    nonCriticalExtension                        SEQUENCE { }
OPTIONAL
}
-- Regular non-critical extensions:
UE-NR-Capability-v1610 ::=               SEQUENCE {
    inDeviceCoexInd-r16                         ENUMERATED {supported}
OPTIONAL,
    dl-DedicatedMessageSegmentation-r16         ENUMERATED {supported}
OPTIONAL,
    nrdc-Parameters-v1610                       NRDC-Parameters-v1610
OPTIONAL,
    powSav-Parameters-r16                       PowSav-Parameters-r16
OPTIONAL,
    fr1-Add-UE-NR-Capabilities-v1610            UE-NR-CapabilityAddFRX-
Mode-v1610                                  OPTIONAL,
    fr2-Add-UE-NR-Capabilities-v1610            UE-NR-CapabilityAddFRX-
Mode-v1610                                  OPTIONAL,
    bh-RLF-Indication-r16                       ENUMERATED {supported}
OPTIONAL,
    directSN-AdditionFirstRRC-IAB-r16           ENUMERATED {supported}
OPTIONAL,
    bap-Parameters-r16                          BAP-Parameters-r16
OPTIONAL,
    referenceTimeProvision-r16                  ENUMERATED {supported}
OPTIONAL,
    sidelinkParameters-r16                      SidelinkParameters-r16
OPTIONAL,
    highSpeedParameters-r16                     HighSpeedParameters-r16
OPTIONAL,
```

TABLE 6-continued

| UE-NR-Capability IE | |
| --- | --- |
| mac-Parameters-v1610 OPTIONAL, | MAC-Parameters-v1610 |
| mcgRLF-RecoveryViaSCG-r16 OPTIONAL, | ENUMERATED {supported} |
| resumeWithStoredMCG-SCells-r16 OPTIONAL, | ENUMERATED {supported} |
| resumeWithStoredSCG-r16 OPTIONAL, | ENUMERATED {supported} |
| resumeWithSCG-Config-r16 OPTIONAL, | ENUMERATED {supported} |
| ue-BasedPerfMeas-Parameters-r16 Parameters-r16 | UE-BasedPerfMeas- OPTIONAL, |
| son-Parameters-r16 OPTIONAL, | SON-Parameters-r16 |
| onDemandSIB-Connected-r16 OPTIONAL, | ENUMERATED {supported} |
| nonCriticalExtension OPTIONAL } | UE-NR-Capability-v1640 |
| UE-NR-Capability-v1640 ::= | SEQUENCE { |
| redirectAtResumeByNAS-r16 OPTIONAL, | ENUMERATED {supported} |
| phy-ParametersSharedSpectrumChAccess-r16 Phy-ParametersSharedSpectrumChAccess-r16 | OPTIONAL, |
| nonCriticalExtension OPTIONAL } | UE-NR-Capability-v17xy |
| UE-NR-Capability-v17xy ::= | SEQUENCE { |
| newCalcResumeMAC-I-r17 OPTIONAL, | ENUMERATED {supported} |
| nonCriticalExtension OPTIONAL } | SEQUENCE { } |
| UE-NR-CapabilityAddXDD-Mode ::= | SEQUENCE { |
| phy-ParametersXDD-Diff OPTIONAL, | Phy-ParametersXDD-Diff |
| mac-ParametersXDD-Diff OPTIONAL, | MAC-ParametersXDD-Diff |
| measAndMobParametersXDD-Diff | MeasAndMobParametersXDD-Diff OPTIONAL |
| } | |
| UE-NR-CapabilityAddXDD-Mode-v1530 ::= | SEQUENCE { |
| eutra-ParametersXDD-Diff } | EUTRA-ParametersXDD-Diff |
| UE-NR-CapabilityAddFRX-Mode ::= SEQUENCE { | |
| phy-Parameters FRX-Diff OPTIONAL, | Phy-Parameters FRX-Diff |
| measAndMobParameters FRX-Diff OPTIONAL } | MeasAndMobParameters FRX-Diff |
| UE-NR-CapabilityAddFRX-Mode-v1540 ::= | SEQUENCE { |
| ims-Parameters FRX-Diff OPTIONAL } | IMS-Parameters FRX-Diff |
| UE-NR-CapabilityAddFRX-Mode-v1610 ::= | SEQUENCE { |
| powSav-ParametersFRX-Diff-r16 Diff-r16 | PowSav-ParametersFRX- OPTIONAL, |
| mac-Parameters FRX-Diff-r16 r16 } | MAC-Parameters FRX-Diff-r16 OPTIONAL |
| BAP-Parameters-r16 ::= | SEQUENCE { |
| flowControlBH-RLC-ChannelBased-r16 OPTIONAL, | ENUMERATED {supported} |
| flowControlRouting-ID-Based-r16 OPTIONAL } | ENUMERATED {supported} |

Comparing the definition shown in Table 6 above to the current definition in 3GPP TS 38.306, e.g. V 16.5.0, one will see that the "nonCriticalExtension" is a UE-NR-Capability-v17xy IE, which IE contains a newCalcResumeMAC-I-r17 IE which is used to indicate whether or not the UE supports the new calculation feature.

In one embodiment, the network (e.g., gNB) used SIB1 to indicate support for a new calculation of resumeMAC-I as capability. SIB1, which is transmitted by a gNB on the Broadcast Control Channel (BCCH) contains information relevant when evaluating if a UE is allowed to access a cell and defines the scheduling of other system information. It also contains radio resource configuration information that is common for all UEs and barring information applied to the unified access control.

In one embodiment, SIB1 is defined as shown in Table 7 below.

TABLE 7

| SIB1 |
|---|

```
SIB1 ::=   SEQUENCE {
  cellSelectionInfo                       SEQUENCE {
    q-RxLevMin                              Q-RxLevMin,
    q-RxLevMinOffset                        INTEGER (1..8)
OPTIONAL,   -- Need S
    q-RxLevMinSUL                           Q-RxLevMin
OPTIONAL,   -- Need R
    q-QualMin                               Q-QualMin
OPTIONAL,   -- Need S
    q-QualMinOffset                         INTEGER (1..8)
OPTIONAL   -- Need S
  }
OPTIONAL,   -- Cond Standalone
  cellAccessRelatedInfo                   CellAccessRelatedInfo,
  connEstFailureControl                   ConnEstFailureControl
OPTIONAL,   -- Need R
  si-SchedulingInfo                       SI-SchedulingInfo
OPTIONAL,   -- Need R
  servingCellConfigCommon                 ServingCellConfigCommonSIB
OPTIONAL,   -- Need R
  ims-EmergencySupport                    ENUMERATED {true}
OPTIONAL,   -- Need R
  eCallOverIMS-Support                    ENUMERATED {true}
OPTIONAL,   -- Need R
  ue-TimersAndConstants                   UE-TimersAndConstants
OPTIONAL,   -- Need R
  uac-BarringInfo                         SEQUENCE {
    uac-BarringForCommon                      UAC-BarringPerCatList
OPTIONAL,   -- Need S
    uac-BarringPerPLMN-List                   UAC-BarringPerPLMN-List
OPTIONAL,   -- Need S
    uac-BarringInfoSetList                    UAC-BarringInfoSetList,
    uac-AccessCategory1-SelectionAssistanceInfo CHOICE {
      plmnCommon                                UAC-AccessCategory1-
SelectionAssistanceInfo,
      individualPLMNList                        SEQUENCE (SIZE
(2..maxPLMN)) OF UAC-AccessCategory1-SelectionAssistanceInfo
    }
OPTIONAL   -- Need S
  }
OPTIONAL,   -- Need R
  useFullResumeID                         ENUMERATED {true}
OPTIONAL,   -- Need R
  lateNonCriticalExtension                OCTET STRING
OPTIONAL,
  nonCriticalExtension                    SIB1-v1610-IEs
OPTIONAL
}
SIB1-v1610-IEs ::=                        SEQUENCE {
  idleModeMeasurementsEUTRA-r16             ENUMERATED{true}
OPTIONAL,   -- Need R
  idleModeMeasurementsNR-r16                ENUMERATED{true}
OPTIONAL,   -- Need R
  posSI-SchedulingInfo-r16                  PosSI-SchedulingInfo-r16
OPTIONAL,   -- Need R
  nonCriticalExtension                      SIB1-v1630-IEs
OPTIONAL
}
SIB1-v1630-IEs ::=                        SEQUENCE {
  uac-BarringInfo-v1630                     SEQUENCE {
    uac-AC1-SelectAssistInfo-r16                SEQUENCE (SIZE (2..maxPLMN))
OF UAC-AC1-SelectAssistInfo-r16
  }
OPTIONAL,   -- Need R
  nonCriticalExtension                      SIB1-v17xy-IEs
OPTIONAL
}
SIB1-v17xy-IEs ::=                        SEQUENCE {
  newCalcResumeMAC-I-r17                     ENUMERATED {true} OPTIONAL,   --
Need R
  nonCriticalExtension                      SEQUENCE { }
OPTIONAL
}
UAC-AccessCategory1-SelectionAssistanceInfo ::=          ENUMERATED {a, b,
c}
```

TABLE 7-continued

| SIB1 |
| --- |
| UAC-AC1-SelectAssistInfo-r16 ::=    ENUMERATED {a, b, c, notConfigured} |

Comparing the definition shown in Table 7 above to the current SIB1 definition, one will see that the "nonCriticalExtension" is a SIB1-v17xy-IEs IE, which IE contains a newCalcResumeMAC-I-r17 IE which is used to indicate whether or not the cell supports the new calculation for the resumeMAC-I according also to the fields included in the RRCResumeRequest or RRCResumeRequest1 message. Table 8 below provides the SIB1 field description.

TABLE 8

| SIB1 field descriptions |
| --- |
| cellSelectionInfo |
| Parameters for cell selection related to the serving cell. eCallOverIMS-Support |
| Indicates whether the cell supports eCall over IP Multimedia Subsystem (IMS) services as defined in TS 23.501, e.g V 17.1.1. If absent, eCall over IMS is not supported by the network in the cell. idleModeMeasurementsEUTRA |
| This field indicates that a UE that is configured for Evolved Universal mobile Telecommunications System Terrestrial Radio Access (EUTRA) idle/inactive measurements shall perform the measurements while camping in this cell and report availability of these measurements when establishing or resuming a connection in this cell. If absent, a UE is not required to perform EUTRA idle/inactive measurements. idleModeMeasurementsNR |
| This field indicates that a UE that is configured for NR idle/inactive measurements shall perform the measurements while camping in this cell and report availability of these measurements when establishing or resuming a connection in this cell. If absent, a UE is not required to perform NR idle/inactive measurements. ims-EmergencySupport |
| Indicates whether the cell supports IMS emergency bearer services for UEs in limited service mode. If absent, IMS emergency call is not supported by the network in the cell for UEs in limited service mode. newCalcResumeMAC-I |
| Indicates whether the cell support the new calculation for the resumeMAC-I according also to the fields included in the RRCResumeRequest or RRCResumeRequest1 message. q-QualMin |
| Parameter "Qqualmin" in TS 38.304 .e.g. V16.4.0, applicable for serving cell. If the field is absent, the UE applies the (default) value of negative infinity for Qqualmin. q-QualMinOffset |
| Parameter "Qqualminoffset" in TS 38.304. Actual value Qqualminoffset = field value [dB]. If the field is absent, the UE applies the (default) value of 0 dB for Qqualminoffset. Affects the minimum required quality level in the cell. q-RxLevMin |
| Parameter "$Q_{rxlevmin}$" in TS 38.304, applicable for serving cell. q-RxLevMinOffset |
| Parameter "$Q_{rxlevminoffset}$" in TS 38.304. Actual value Qrxlevminoffset = field value * 2 [dB]. If absent, the UE applies the (default) value of 0 dB for Qrxlevminoffset. Affects the minimum required Rx level in the cell. |

TABLE 8-continued

| q-RxLevMinSUL |
| --- |
| Parameter "Qrxlevmin" in TS 38.304, applicable for serving cell. servingCellConfigCommon |
| Configuration of the serving cell. uac-AccessCategory1-SelectionAssistanceInfo |
| Information used to determine whether Access Category 1 applies to the UE, as defined in TS 22.261, e.g. V17.7.0. If plmnCommon is chosen, the UAC-AccessCategory1-SelectionAssistanceInfo is applicable to all the Public land mobile networks (PLMNs) in plmn-IdentityList. If individualPLMNList is chosen, the 1st entry in the list corresponds to the first PLMN in plmn-IdentityList, the 2nd entry in the list corresponds to the second PLMN in plmn-IdentityList and so on. If uac-AC1-SelectAssistInfo-r16 is present, the UE shall ignore the uac-AccessCategory1-SelectionAssistanceInfo. uac-AC1-SelectAssistInfo |
| Information used to determine whether Access Category 1 applies to the UE, as defined in TS 22.261, e.g. V17.7.0. The 1st entry in the list corresponds to the first PLMN in plmn-IdentityList, the 2nd entry in the list corresponds to the second PLMN in plmn-IdentityList and so on. Value notConfigured indicates that Access Category1 is not configured for the corresponding PLMN. uac-BarringForCommon |
| Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in clause 5.3.14.2 of TS38.331, e.g. V16.4.1. ue-TimersAndConstants |
| Timer and constant values to be used by the UE. The cell operating as PCell always provides this field. useFullResumeID |
| Indicates which resume identifier and Resume request message should be used. UE uses fulII-RNTI and RRCResumeRequest1 if the field is present, or shortI-RNTI and RRCResumeRequest if the field is absent. |

| Conditional Presence | Explanation |
| --- | --- |
| Standalone | The field is mandatory present in a cell that supports standalone operation, otherwise it is absent. |

In one embodiments, the network indicates support for new calculation of resumeMAC-I in an RRCRelease message, which is a message transmitted by a gNB to UE on the downlink control channel (DCCH). The RRCRelease message is used to command the release of an RRC connection or the suspension of the RRC connection. In one embodiment, RRCRelease is defined as shown in Table 9 below.

TABLE 9

| RRCRelease | |
|---|---|
| RRCRelease ::= | SEQUENCE { |
| rrc-TransactionIdentifier | RRC-TransactionIdentifier, |
| criticalExtensions | CHOICE { |
| rrcRelease | RRCRelease-IEs, |
| criticalExtensionsFuture | SEQUENCE { } |
| } | |
| } | |
| RRCRelease-IEs ::= | SEQUENCE { |
| redirectedCarrierInfo | RedirectedCarrierInfo |
| OPTIONAL,   -- Need N | |
| cellReselectionPriorities | CellReselectionPriorities |
| OPTIONAL,   -- Need R | |
| suspendConfig | SuspendConfig |
| OPTIONAL,   -- Need R | |
| deprioritisationReq | SEQUENCE { |
| deprioritisationType | ENUMERATED {frequency, |
| nr}, | |
| deprioritisationTimer | ENUMERATED {min5, min10, |
| min15, min30} | |
| } | |
| OPTIONAL,   -- Need N | |
| lateNonCriticalExtension | OCTET STRING |
| OPTIONAL, | |
| nonCriticalExtension | RRCRelease-v1540-IEs |
| OPTIONAL | |
| } | |
| RRCRelease-v1540-IEs ::= | SEQUENCE { |
| waitTime | RejectWaitTime |
| OPTIONAL,   -- Need N | |
| nonCriticalExtension | RRCRelease-v1610-IEs |
| OPTIONAL | |
| } | |
| RRCRelease-v1610-IEs ::= | SEQUENCE { |
| voiceFallbackIndication-r16 | ENUMERATED {true} |
| OPTIONAL,   -- Need N | |
| measIdleConfig-r16 | SetupRelease |
| {MeasIdleConfigDedicated-r16} | OPTIONAL, -- Need M |
| nonCriticalExtension | RRCRelease-v17xy-IEs |
| OPTIONAL | |
| } | |
| RRCRelease-v17xy-IEs ::= | SEQUENCE { |
| newCalcResumeMAC-I-r17 | ENUMERATED {true} OPTIONAL,   -- |
| Need R | |
| nonCriticalExtension | SEQUENCE { } |
| OPTIONAL | |
| } | |
| RedirectedCarrierInfo ::= | CHOICE { |
| nr | CarrierInfoNR, |
| eutra | RedirectedCarrierInfo-EUTRA, |
| ... | |
| } | |
| RedirectedCarrierInfo-EUTRA ::= | SEQUENCE { |
| eutraFrequency | ARFCN-ValueEUTRA, |
| cnType | ENUMERATED {epc,fiveGC} |
| OPTIONAL   -- Need N | |
| } | |
| CarrierInfoNR ::= | SEQUENCE { |
| carrierFreq | ARFCN-ValueNR, |
| ssbSubcarrierSpacing | SubcarrierSpacing, |
| smtc | SSB-MTC |
| OPTIONAL,   -- Need S | |
| ... | |
| } | |
| SuspendConfig ::= | SEQUENCE { |
| fullI-RNTI | I-RNTI-Value, |
| shortI-RNTI | ShortI-RNTI-Value, |
| ran-PagingCycle | PagingCycle, |
| ran-NotificationAreaInfo | RAN-NotificationAreaInfo |
| OPTIONAL,   -- Need M | |
| t380 | PeriodicRNAU-TimerValue |
| OPTIONAL,   -- Need R | |
| nextHopChainingCount | NextHopChainingCount, |
| ... | |
| } | |
| PeriodicRNAU-TimerValue ::= | ENUMERATED { min5, min10, min20, |
| min30, min60, min120, min360, min720} | |
| CellReselectionPriorities ::= | SEQUENCE { |
| freqPriorityListEUTRA | FreqPriorityListEUTRA |

TABLE 9-continued

RRCRelease

```
OPTIONAL,  -- Need M
  freqPriorityListNR              FreqPriorityListNR
OPTIONAL,  -- Need M
  t320                            ENUMERATED {min5, min10,
min20, min30, min60, min120, min180, spare1} OPTIONAL,  -- Need R
  ...
}
PagingCycle ::=                   ENUMERATED {rf32, rf64, rf128,
rf256}
FreqPriorityListEUTRA ::=         SEQUENCE (SIZE (1..maxFreq)) OF
FreqPriorityEUTRA
FreqPriorityListNR ::=            SEQUENCE (SIZE (1..maxFreq)) OF
FreqPriorityNR
FreqPriorityEUTRA ::=             SEQUENCE {
  carrierFreq                       ARFCN-ValueEUTRA,
  cellReselectionPriority           CellReselectionPriority,
  cellReselectionSubPriority        CellReselectionSubPriority
OPTIONAL   -- Need R
}
FreqPriorityNR ::=                SEQUENCE {
  carrierFreq                       ARFCN-ValueNR,
  cellReselectionPriority           CellReselectionPriority,
  cellReselectionSubPriority        CellReselectionSubPriority
OPTIONAL   -- Need R
}
RAN-NotificationAreaInfo ::=      CHOICE {
  cellList                          PLMN-RAN-AreaCellList,
  ran-AreaConfigList                PLMN-RAN-AreaConfigList,
  ...
}
PLMN-RAN-AreaCellList ::=         SEQUENCE (SIZE (1..
maxPLMNIdentities)) OF PLMN-RAN-AreaCell
PLMN-RAN-AreaCell ::=             SEQUENCE {
  plmn-Identity                     PLMN-Identity
OPTIONAL,  -- Need S
  ran-AreaCells                     SEQUENCE (SIZE (1..32)) OF
CellIdentity
}
PLMN-RAN-AreaConfigList ::=       SEQUENCE (SIZE
(1..maxPLMNIdentities)) OF PLMN-RAN-AreaConfig
PLMN-RAN-AreaConfig ::=           SEQUENCE {
  plmn-Identity                     PLMN-Identity
OPTIONAL,  -- Need S
  ran-Area                          SEQUENCE (SIZE (1..16)) OF
RAN-AreaConfig
}
RAN-AreaConfig ::=                SEQUENCE {
  trackingAreaCode                  TrackingAreaCode,
  ran-AreaCodeList                  SEQUENCE (SIZE (1..32)) OF
RAN-AreaCode                        OPTIONAL   -- Need R
}
-- TAG-RRCRELEASE-STOP
-- ASN1STOP
```

Table 10 below provides the RRCRelease-IEs field descriptions.

TABLE 10

RRCRelease-IEs field descriptions cnType

Indicate that the UE is redirected to Evolved Packet Core (EPC) or 5GC.

deprioritisationReq

Indicates whether the current frequency or Radio Access Technology (RAT) is to be de-prioritised.

deprioritisationTimer

Indicates the period for which either the current carrier frequency or NR is deprioritised. Value minN corresponds to N minutes.

TABLE 10-continued measIdleConfig

Indicates measurement configuration to be stored and used by the UE while in RRC_IDLE or RRC_INACTIVE.

newCalcResumeMAC-I

Indicates whether the cell support the new calculation for the resumeMAC-I according also to the fields included in the RRCResumeRequest or RRCResumeRequest1 message.

suspendConfig

Indicates configuration for the RRC_INACTIVE state. The network does not configure suspendConfig when the network redirect the UE to an inter-RAT carrier frequency or if the UE is configured with a Dual Active Protocol Stack (DAPS) bearer.

redirectedCarrierInfo

Indicates a carrier frequency (downlink for Frequency Division Duplex (FDD)) and is used to redirect the UE to an NR or an inter-RAT carrier TABLE 10-continued frequency, by means of cell selection att ransition to RRC_IDLE or RRC_INACTIVE as specified in TS 38.304, e.g. V16.4.0. Based on UE capability, the network may include redirectedCarrierInfo in RRCRelease message with suspendConfig if this message is sent in response to an RRCResumeRequest or an RRCResumeRequest1 which is triggered by the NAS layer (see 5.3.1.4 in TS 24.501, e.g. V17.3.0).
voiceFallbackIndication Indicates the RRC release is triggered by Evolved Packet System (EPS) fallback for IMS voice as specified in TS 23.502, e.g. V17.1.0.

CarrierInfoNR field descriptions carrierFreq

Indicates the redirected NR frequency.
ssbSubcarrierSpacing

Subcarrier spacing of Synchronization Signal Block (SSB) in the redirected SSB frequency. Only the values 15 kHz or 30 kHz (FR1), and 120 KHz or 240 kHz (FR2) are applicable.
smtc The SSB periodicity/offset/duration configuration for the redirected SSB frequency. It is based on timing reference of PCell. If the field is absent, the UE uses the SSB based measurement timing configuration (SMTC) configured in the measObjectNR having the same SSB frequency and subcarrier spacing.

RAN-NotificationAreaInfo field descriptions cellList

A list of cells configured as RAN area.
ran-AreaConfigList

A list of RAN area codes or RA code(s) as RAN area.

PLMN-RAN-AreaConfig field descriptions plmn-Identity

PLMN Identity to which the cells in ran-Area belong. If the field is absent the UE uses the ID of the registered PLMN.
ran-AreaCodeList The total number of RAN-AreaCodes of all PLMNs does not exceed 32.
ran-Area Indicates whether Tracking Area (TA) code(s) or RAN area code(s) are used for the RAN notification area. The network uses only TA code(s) or both TA code(s) and RAN area code(s) to configure a UE.
The total number of TACs across all PLMNs does not exceed 16.

PLMN-RAN-AreaCell field descriptions plmn-Identity

PLMN Identity to which the cells in ran-AreaCells belong. If the field is absent the UE uses the ID of the registered PLMN.
ran-AreaCells The total number of cells of all PLMNs does not exceed 32.

SuspendConfig field descriptions ran-NotificationAreaInfo

Network ensures that the UE in RRC_INACTIVE always has a valid ran-NotificationAreaInfo.
ran-PagingCycle Refers to the UE specific cycle for RAN-initiated paging. Value rf32 corresponds to 32 radio frames, value rf64 corresponds to 64 radio frames and so on.

TABLE 10-continued t380

Refers to the timer that triggers the periodic RAN-based Notification Area Update (RNAU) procedure in UE. Value min5 corresponds to 5 minutes, value min10 corresponds to 10 minutes and so on.

C. Inter-gNB Capability Indication of the New Resume-MAC-I/shortResumeMAC-I Calculation In one embodiment, if the UE tries to resume to a gNB (i.e., target gNB) that is different from the gNB that previously released the UE to the RRC_INACTIVE state (i.e., source gNB), then the target gNB, when triggering the Retrieve UE Context Request procedure, includes in the Retrieve UE Context request message i) a support indication indicating the support (or not) of the new calculation for the fields ResumeMAC-I/shortResumeMAC-I and ii) all the fields included in the VarResumeMac-Input.

Accordingly, the source gNB may determine whether the target gNB supports (or does not support) the new calculation for the resumeMAC-I either from the support indication itself or just by the presence of all the fields included in the VarResumeMac-Input. Further, how the target gNB includes all the fields of the VarResumeMac-Input can be by means of a container (i.e., OCTET STRING) where all the fields of the VarResumeMac-Input is included. Otherwise, another solution would be for the target gNB to include the fields one-by-one in different fields.

In another embodiment, such indication from the target gNB to the source gNB is included in a new or existing X2/Xn signalling/message or, as an alternative, such indication is included in a new of existing inter-node RRC message.

In one embodiment, if the source gNB receives no indication from the target gNB that the target gNB supports the new calculation for the fields ResumeMAC-I/shortResume-MAC-I, the source gNB uses the old/legacy calculation to validate the ResumeMAC-I/shortResumeMAC-I of the UE. Further, if the source gNB receives the indication from the target gNB that the target gNB supports the new calculation to calculate and validate the fields ResumeMAC-I/shortResumeMAC-I, the source gNB uses the new calculation to calculate and validate the ResumeMAC-I/shortResumeMAC-I of the UE.

The target gNB may provide to the source gNB the resumeMAC-I and a modified version of the resume request, in which case the source gNB simply uses the provided resume request to calculate its version of resumeMAC-I and then compares that with the provided resumeMAC-I in order to verify the UE (i.e., determine that the UE is authentic).

The target gNB may provide resumeMAC-I and the resume request (received from the UE) to the source gNB, in which case the source gNB prepares a modified version of the provided resume request message and uses it to calculate the source gNB's version of resumeMAC-I and then compares that with the provided version of resumeMAC-I.

The target gNB may provide the resume request (received from the UE) to the source gNB, in which case the source gNB extracts the resumeMAC-I from the provided resume request message and then prepares a modified version of the provided resume request message and uses the modified version to calculate the source gNB's version of resume-MAC-I and then compares that with the provided version of resumeMAC-I (i.e., the resumeMAC-I extracted from the resume request received from the target gNB).

Preparing a modified version of the resume request means modifying the resumeMAC-I field in the ways described above in this document (e.g., replacing the value contained in the resumeMAC-I field with a pre-defined value, removing the field, replacing with different type, etc.)

Implementation Examples

The target gNB in some embodiments may indicate support for new calculation for the resumeMAC-I to the source gNB using the Retrieve UE Context Request message. This message is sent by the new NG-RAN node to request the old NG-RAN node to transfer the UE Context to the new NG-RAN. In one embodiment, the Retrieve UE Context Request message is defined as shown in Table 11 below.

TABLE 11

| IE/Group Name | Presence | Range | IE type and reference | Semantics description | Criticality | Assigned Criticality |
|---|---|---|---|---|---|---|
| Retrieve UE Context Request message | | | | | | |
| Message Type | M | | Clause 9.2.3.1 of TS 38.423, e.g. V16.5.0. | | YES | reject |
| New NG-RAN node UE XnAP ID reference | M | | NG-RAN node UE XnAP ID 9.2.3.16 of TS 38.423, e.g. V16.5.0. | Allocated at the new NG-RAN node | YES | reject |
| UE Context ID | M | | 9.2.3.40 of TS 38.423, e.g. V16.5.0. | | YES | reject |
| Integrity protection | M | | BIT STRING (SIZE (16)) | RRC Resume: ResumeMAC-I either contained in the RRCResumeRequest or the RRCResumeRequest1 message as defined in TS 38.331 or the ShortResumeMAC-I in the RRCConnectionResumeRequest message as defined in TS 36.331, e.g. V 16.5.0. RRC Reestablishment: ShortMAC-I contained in the RRCReestablishmentRequest as defined in TS 38.331) or the ShortMAC-I in the RRCConnectionReestablishmentRequest message as defined in TS 36.331). RRC Resume for UP CIoT Optimization: ShortResumeMAC-I in the RRCConnectionResumeRequest message or RRCConnectionResumeRequest-NB message as defined in TS 36.331. | YES | reject |
| New Cell Identifier | M | | NG-RAN Cell Identity, clause 9.2.2.9 of TS 38.423, e.g. V16.5.0. | RRC Resume: Corresponds to the targetCellIdentity within the VarResumeMAC-Input as specified in TS 38.331 or the cellIdentity within the VarShortINACTIVE-MAC-Input as specified in TS 36.331. RRC Reestablishment: Corresponds to the targetCellIdentity within the VarShortMAC-Input as specified in TS 38.331 | YES | reject |

TABLE 11-continued

Retrieve UE Context Request message

| IE/Group Name | Presence | Range | IE type and reference | Semantics description | Criticality | Assigned Criticality |
|---|---|---|---|---|---|---|
| | | | | or the cellIdentity within the VarShortMAC-Input as specified in TS 36.331. RRC Resume for UP CIoT Optimization: Corresponds to the cellIdentity within the VarShortResumeMAC-Input or VarShortResumeMAC-Input-NB as specified in TS 36.331. | | |
| RRC Resume Cause | O | | Clause 9.2.3.61 of TS 38.423, e.g. V16.5.0. | In case of RNA Update, contains the cause value provided by the UE in the RRCResumeRequest or the RRCResumeRequest1 message, as defined in TS 38.331, or in the RRCConnectionResumeRequest message, as defined in TS 36.331. | YES | ignore |
| New calculation ResumeMAC-I | O | | ENUMERATED (true, . . .) | Indicates whether the cell support the new calculation for the resumeMAC-I according also to the fields included in the RRCResumeRequest or RRCResumeRequest1 message. | YES | ignore |
| Parameters for calculation ResumeMAC-I (alternative 1) | O | | OCTET STRING | Include the RRCResumeRequest or RRCResumeRequest1 message provided by the UE, as defined in TS 38.331 Or Include a modified version of RRCResumeRequest or RRCResumeRequest1 in which the ResumeMAC-I field is replaced as mentioned earlier (e.g., with BITSTRING of pre-defined values or with different type, or with the field removed) | YES | ignore |
| Parameters for calculation ResumeMAC-I (alternative 2) | | 1 | | | YES | ignore |
| >Source PHY cell ID (alternative 2) | M | | NG-RAN Cell Identity, clause 9.2.2.9 of TS 38.423, e.g. V16.5.0. | Corresponds to the sourcePhysCellId within the VarResumeMAC-Input as specified in TS 38.331. | | |
| >Source C-RNTI (alternative 2) | M | | BIT STRING (SIZE (16)) | C-RNTI allocated at the source NG-RAN node (in NG-RAN node) | | |

TABLE 11-continued

| IE/Group Name | Presence | Range | IE type and reference | Semantics description | Criticality | Assigned Criticality |
|---|---|---|---|---|---|---|
| >Resume identity (alternative 2) | M | | BIT STRING (SIZE (24)) | This IE is used to identify the suspended UE context of a UE in RRC_INACTIVE using 24 bits (refer to ShortI-RNTI-Value IE in TS 38.331. | | |
| >RRC Resume Cause (alternative 2) | M | | Clause 9.2.3.61 of TS 38.423, e.g. V16.5.0. | Contains the cause value provided by the UE in the RRCResumeRequest or the RRCResumeRequest1 message, as defined in TS 38.331. | | |

Figure 20:
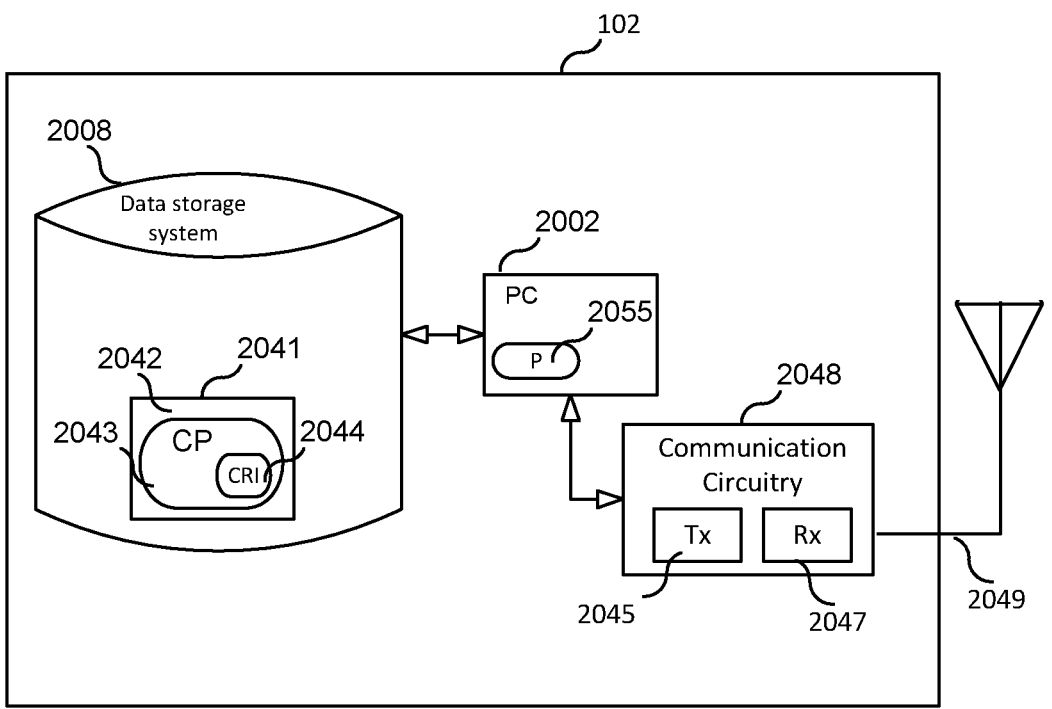
FIG. 20 is a block diagram of a UE according to some embodiments.

FIG. 20 is a block diagram of UE 102, according to some embodiments. As shown in FIG. 20, the UE 102 may comprise: processing circuitry (PC) 2002, which may include one or more processors (P) 2055 (e.g., one or more general purpose microprocessors and/or one or more other processors, such as an application specific integrated circuit (ASIC), field-programmable gate arrays (FPGAs), and the like); communication circuitry 2048, which is coupled to an antenna arrangement 2049 comprising one or more antennas and which comprises a transmitter (Tx) 2045 and a receiver (Rx) 2047 for enabling the UE 102 to transmit data and receive data (e.g., wirelessly transmit/receive data); and a local storage unit (a.k.a., "data storage system") 2008, which may include one or more non-volatile storage devices and/or one or more volatile storage devices. In embodiments where PC 2002 includes a programmable processor, a computer program product (CPP) 2041 may be provided. CPP 2041 includes a computer readable medium (CRM) 2042 storing a computer program (CP) 2043 comprising computer read-able instructions (CRI) 2044. CRM 2042 may be a non-transitory computer readable medium, such as, magnetic media (e.g., a hard disk), optical media, memory devices (e.g., random access memory, flash memory), and the like. In some embodiments, the CRI 2044 of computer program 2043 is configured such that when executed by PC 2002, the CRI causes UE 102 to perform steps described herein (e.g., steps described herein with reference to the flow charts). In other embodiments, UE 102 may be configured to perform steps described herein without the need for code. That is, for example, PC 2002 may consist merely of one or more ASICs. Hence, the features of the embodiments described herein may be implemented in hardware and/or software.

Figure 21:
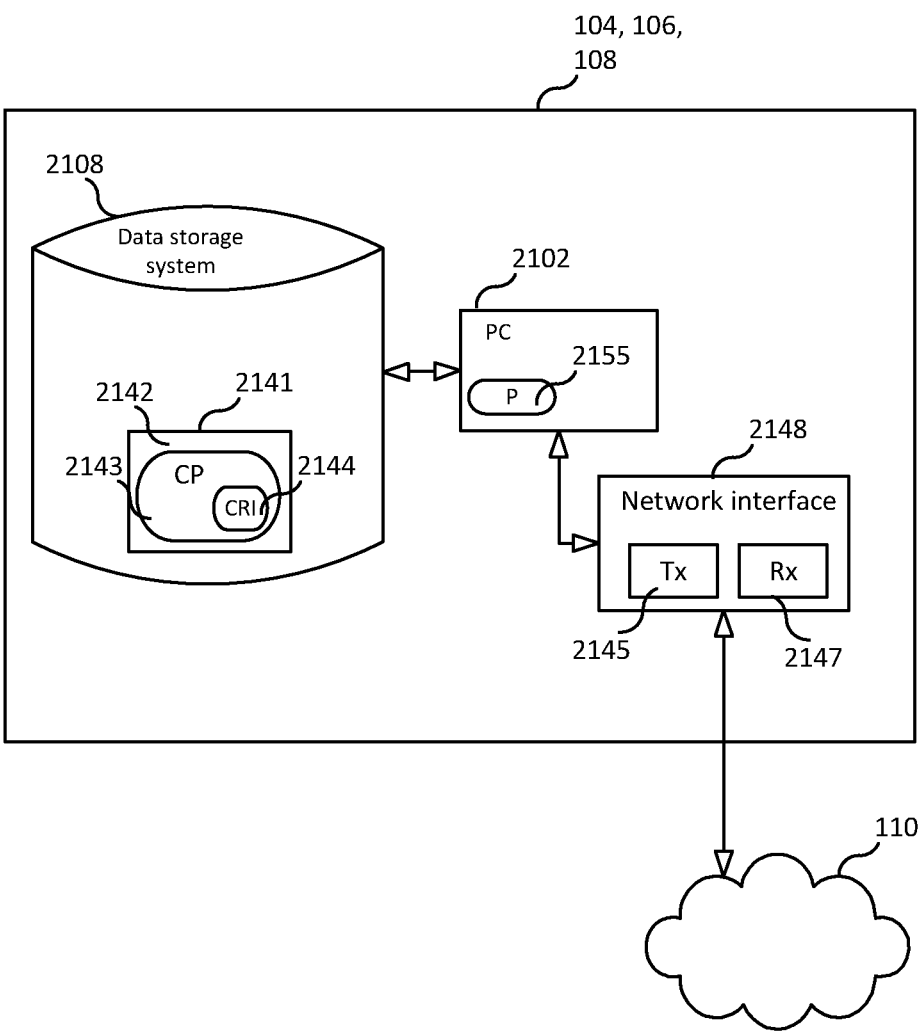
FIG. 21 is a block diagram of a network node according to some embodiments.

FIG. 21 is a block diagram of a network node (e.g., any one of network nodes 104, 106, or 108) according to some embodiments. As shown in FIG. 21, the network node 104, 106, or 108 may comprise: processing circuitry (PC) 2102, which may include one or more processors (P) 2155 (e.g., a general purpose microprocessor and/or one or more other processors, such as an application specific integrated circuit (ASIC), field-programmable gate arrays (FPGAs), and the like), which processors may be co-located in a single hous-ing or in a single data center or may be geographically distributed (i.e., the network node may be a distributed computing apparatus): at least one network interface 2148 comprising a transmitter (Tx) 2145 and a receiver (Rx) 2147 for enabling the network node to transmit data to and receive data from other nodes connected to a network 110 (e.g., an Internet Protocol (IP) network) to which network interface 2148 is connected (directly or indirectly) (e.g., network interface 2148 may be wirelessly connected to the network 110, in which case network interface 2148 is connected to an antenna arrangement); and a storage unit (a.k.a., "data storage system") 2108, which may include one or more non-volatile storage devices and/or one or more volatile storage devices. In embodiments where PC 2102 includes a programmable processor, a computer program product (CPP) 2141 may be provided. CPP 2141 includes a com-puter readable medium (CRM) 2142 storing a computer program (CP) 2143 comprising computer readable instruc-tions (CRI) 2144. CRM 2142 may be a non-transitory computer readable medium, such as, magnetic media (e.g., a hard disk), optical media, memory devices (e.g., random access memory, flash memory), and the like. In some embodiments, the CRI 2144 of computer program 2143 is configured such that when executed by PC 2102, the CRI causes the network node to perform steps described herein (e.g., steps described herein with reference to one or more of the flow charts). In other embodiments, the network node may be configured to perform steps described herein without the need for code. That is, for example, PC 2102 may consist merely of one or more ASICs. Hence, the features of the embodiments described herein may be implemented in hard-ware and/or software.

Summary of Various Embodiments

Embodiment A—Option 1

A1. A method (1000) (see FIG. 10) for generating an authentication token, the method comprising: obtaining (e.g., generating, receiving, retrieving) (s1002) a first connection resume request message that comprises: i) a first field/resume cause field containing a cause value, ii) a second field/resume identity field containing an identity value, and iii) a third field/token field (e.g., a ResumeMAC-I field) containing a pre-defined token value (e.g., all 0s or all 1s or etc.); and using (s1004) the first connection resume request message to generate an authentication token.

A1.1. The method of embodiment A1, wherein the third field is a ResumeMAC-I field or a ShortMAC-I

FIELD

Embodiment A—Option 2

A2. A method (1100) (see FIG. 11) for generating an authentication token, the method comprising: obtaining (s1102) a first connection resume request message that comprises a first field/resume cause field containing a cause value and a second field/resume identity field containing an identity value, but the first connection resume request message does not include any token field (e.g., a ResumeMAC-I field); and using (s1104) the first connection resume request message to generate an authentication token.

A2.1. The method of embodiment A1 or A2, wherein the first field is resume cause field and the cause value indicates a resume cause for the connection resume request, and the second field is a resume identity field and the identity value is a value for a type of Radio Network Temporary Identifier (RNTI).

Embodiment A—Option 3

A3. A method (1200) (see FIG. 12) for generating an authentication token, the method comprising: obtaining (s1202) a first connection resume request message that comprises: i) a resume cause field containing a cause value, ii) a resume identity field containing an identity value, and iii) a token field having a first type (e.g., "NULL" type); using (s1204) the first connection resume request message to generate an authentication token.

A4. The method of any one of the previous embodiments, wherein the first connection resume request message is encoded according to an Unaligned Packed Encoding Rule (UPER).

A5. The method of any one of the previous embodiments, wherein the method is performed by a user equipment, UE,/communication device.

A6. The method of embodiment A5, further comprising: the UE generating a second connection resume request message that comprises: i) a resume cause field that contains the cause value, ii) a resume identity field containing the identity value, and iii) a token field containing the generated authentication token; and transmitting the second connection resume request message to a network node of an access network.

A6.1 The method of embodiment 6 when dependent on embodiment A3, wherein the first type is NULL, and the token field of the second connection resume request message has a type of bit string.

A7. The method of any one of embodiments A1-A4, wherein the method is performed by a first network node/network device of an access network (e.g., source gNB).

A8. The method of embodiment A7, further comprising receiving a message transmitted by a second network node/network device (e.g., target gNB) and comprising a second connection resume request message that was transmitted by a user equipment, UE, wherein the second connection request message comprises: i) a resume cause field that contains the cause value, ii) a resume identity field containing the identity value, and iii) a token field that contains an authentication token, and obtaining the first connection resume request comprises generating the first connection resume request message using the received second connection resume request message.

A8.1 The method of embodiment A8, wherein generating the first connection resume request message using the second connection resume request message comprising i) modifying the second connection resume request message (e.g., replacing the value contained in the resumeMAC-I field with a pre-defined value, removing the field, replacing with different type, etc.) or ii) using information contained within the second connection resume request message to generate the first connection resume request message (e.g., using at least the cause value and identity value, but not the authentication token, from the second message to generate the first message).

A9. The method of embodiment A8 or A8.1, further comprising: the first network node/network device determining whether the generated authorization token is identical to the received authorization token (i.e., the token included in the second connection resume request message that was transmitted by the UE).

A9.1 The method of embodiment A7, wherein obtaining the first connection resume request message comprises the first network node/network device receiving a message transmitted by a second network node/network device (e.g., target gNB), wherein the message transmitted by the second network node/network device comprises the first connection resume request and an authentication token.

A9.2 The method of embodiment A9.1, further comprising the first network node/network device determining whether the generated authorization token is identical to the received authorization token (i.e., the token included in the message transmitted by the second network node/network device).

A10. The method of embodiment A9 or A9.2, further comprising: as a result of determining that the generated authorization token is identical to the received authorization token, the first network node/network device transmitting to the second network node/network device a message for triggering the second network node/network device to transmit an RRC message to the UE (e.g., RRC Resume message, RRC release message, etc.).

A11. The method of embodiment A10, wherein the message sent to the second network node/network device comprises a UE context for the UE.

A12. The method of any of the previous embodiments, wherein using the first connection resume request message to generate the authentication token comprises: i) generating a data structure (e.g., VarResumeMAC-Input) comprising the connection resume request message: ii) encoding the data structure to produce an encoded data structure (e.g., producing an ASN.1 encoded data structure); and iii) using the encoded data structure to generate the authentication token.

Embodiment C

C1. A method (1300) (see FIG. 13) performed by a first network node, the method comprising: receiving (s1302) a message transmitted by a second network node, wherein the message indicates whether the first network node should use a first method for generating an authentication token; and if the message indicates that the first network node should use the first method for generating the authentication token, then using the first method to generate the authentication token, otherwise using a second method to generate the authentication token (s1304).

C2. The method of embodiment C1, wherein the first method comprises the steps of embodiment A1, A2, or A3.

C3. The method of embodiment C1 or C2, wherein the message is a user equipment, UE, context request message.

C4. A method (1900) (see FIG. 19) performed by a target network node/network device, the method comprising: transmitting (s1902) to a source network node/network device a message comprising: i) a first connection resume request message that the target received from a user equipment or ii) a second resume request message that the target generated based on the first connection resume request message.

C5. The method of embodiment C4, further comprising the target obtaining an authentication token form the first connection resume request message and including the authentication token in the message.

Embodiment B—Option 4

B4.1. A method (1400) (see FIG. 14) performed by a user equipment, UE, the method comprising: generating (s1402) a message that indicates whether or not the UE supports using a first method for generating an authentication token for authenticating a connection resume request message; and transmitting (s1404) the message to a core network node.

B4.2. A method (1500) (see FIG. 15) performed by a core network node/core network device, the method comprising: receiving (s1502) a first message, wherein the first message was transmitted by a user equipment, UE, and wherein the first message indicates whether or not the UE supports using a first method for generating an authentication token for authenticating a connection resume request message; and after receiving the first message, transmitting (s1504) a second message to a network node of an access network, wherein the second message indicates whether or not the UE supports using the first method for generating the authentication token.

B4.3. A method (1600) (see FIG. 16) performed by a network node/network device, e.g. a radio base station, of an access network, the method comprising: receiving (s1602) a message transmitted by a core network node, wherein the message identifies a user equipment, UE, and indicates whether or not the identified UE supports using a first method for generating an authentication token for authenticating a connection resume request message; and after receiving the message, determining (s1604), based on the message received from the core network node, whether to use the first method or a second method to generate an authentication token for use in authenticating a connection resume request transmitted by the identified UE.

Embodiment B—Option 3

B3.1. A method (1700) (see FIG. 17) performed by network node/network device, e.g. a radio base station, of an access network, the method comprising: transmitting (s1702) information to a user equipment, UE, wherein i) the information indicates that the network node supports using a first method for generating an authentication token for authenticating a connection resume request message and/or ii) the information instructs the UE to use the first method to generate the authentication token for authenticating a connection resume request message.

B3.2. A method (1800) (see FIG. 18) performed by a user equipment, UE, the method comprising: receiving (s1802) information transmitted by a network node of an access network, wherein i) the information indicates that the network node supports using a first method for generating an authentication token for authenticating a connection resume request message and/or ii) the information instructs the UE to use the first method to generate the authentication token for authenticating a connection resume request message.

B3.3. The method of embodiment B3.1 or B3.2, wherein the information is included in a Medium Access Control Control Element (MAC-CE) or Downlink Control Information (DCI).

D1.1. A computer program (2043) comprising instructions (2044) which when executed by processing circuitry (2002) of a user equipment, UE (102), causes the UE to perform the method of any one of the above UE embodiments (e.g., A1, A2, A3, B4.1, B3.2).

D1.2. A computer program (2143) comprising instructions (2144) which when executed by processing circuitry (2102) of a network node (104, 106, 108), causes the network node to perform the method of any one of the above network node embodiments (e.g., A1, A2, A3 C1, C4, B4.2, B4.3, B3.1).

D2. A carrier containing the computer program of embodiment D1.1 or D1.2, wherein the carrier is one of an electronic signal, an optical signal, a radio signal, and a computer readable storage medium (2042, 2142).

E1. A UE (102), the UE being configured to perform the method of any one of the above UE embodiments (e.g., A1, A2, A3, B4.1, B3.2).

F1. A user equipment, UE (102), the UE comprising: memory (2042); and processing circuitry (2002), wherein the UE is configured to perform the method of any one of the UE embodiments (e.g., A1, A2, A3, B4.1, B3.2).

G1. A network node (104, 106, 108), the network node being configured to perform the method of any one of the network node embodiments (e.g., A1, C1, C4, B4.2, B4.3, B3.1).

H1. A network node (104, 106, 108), the network node comprising: memory (2142); and processing circuitry (2102), wherein the network node is configured to perform the method of any one of the network node embodiments (e.g., A1, C1, C4, B4.2, B4.3, B3.1).

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

Abbreviation Explanation

ACK Acknowledgement
AP Application Protocol
BSR Buffer Status Report
BWP Bandwidth Part
CA Carrier Aggregation
CE Control Element
CP Control Plane
CQI Channel Quality Indicator
DC Dual Connectivity
DL Downlink
eNB (EUTRAN) base station
E-RAB EUTRAN Radio Access Bearer
gNB NR base station, gNodeB
GTP-U GPRS Tunneling Protocol-User Plane
IP Internet Protocol
LTE Long Term Evolution
MCG Master Cell Group
MeNB Master eNB
MgNB Master gNB
MME Mobility Management Entity
MN Master Node
NACK Negative Acknowledgement
PCell Primary Cell
PSCell Primary SCell
PUSCH Physical Uplink Shared Channel
RLC Radio Link Control
RLF Radio Link Failure
SCell Secondary Cell
SCG Secondary Cell Group
SCTP Stream Control Transmission Protocol
SeNB Secondary eNB
SINR Signal to Interference plus Noise Ratio
SN Secondary Node
SR Scheduling Request
SUL Supplementary uplink
TDD Time Division Duplex
TEID Tunnel Endpoint IDentifier
TNL Transport Network Layer
UCI Uplink Control Information
UDP User Datagram Protocol
URLLC Ultra Reliable Low Latency Communication
X2 Interface between base stations

The invention claimed is:

1. A method for generating an authentication token, the method comprising:

obtaining input parameters for use in generating an authentication token, the input parameters comprising: i) a cause value, ii) an identity value, and iii) a pre-defined authentication token, wherein the input parameters are encoded according to an Unaligned Packed Encoding Rule;

using all of said obtained input parameters and an integrity algorithm to generate an authentication token; and 1) transmitting a Radio Resource Control (RRC) connection resume request message comprising: i) the resume cause value, ii) the identify value, and iii) the authentication token generated using the input parameters and the integrity algorithm, or 2) using the authentication token generated using the input parameters and the integrity algorithm to authenticate an RRC connection resume request message transmitted by a user equipment (UE).

2. The method of claim 1, wherein the predefined authentication token is a predefined ResumeMAC-I value or a predefined ShortMAC-I value.

3. The method of claim 1, wherein the cause value indicates a resume cause for the connection resume request, and the identity value is a value for a type of Radio Network Temporary Identifier.

4. The method of claim 1, wherein using the all of said obtained input parameters to generate the authentication token comprises:

i) generating a data structure comprising the cause value, the identity value, and the pre-defined authentication token;

ii) encoding the data structure to produce an encoded data structure; and iii) using the encoded data structure to generate the authentication token.

5. The method of claim 1, wherein the method is performed by a first network node of an access network, and a first RRC connection resume request message comprises: i) the cause value, ii) the identity value, and iii) the pre-defined token value.

6. The method of claim 5, further comprising receiving a message transmitted by a second network node and comprising the RRC connection resume request message that was transmitted by the UE, wherein the RRC connection resume request message transmitted by the UE comprises: i) a resume cause field that contains the cause value, ii) a resume identity field containing the identity value, and iii) a token field that contains an authentication token, and the method further comprises generating the first RRC connection resume request message using the RRC connection resume request message that was transmitted by the UE.

7. The method of claim 6, wherein generating the first RRC connection resume request message i) modifying the RRC connection resume request message that was transmitted by the UE or ii) using information contained within the RRC connection resume request message that was transmitted by the UE to generate the first RRC connection resume request message.

8. The method of claim 6, further comprising:

the first network node determining whether the generated authentication token is identical to the authentication token included in the RRC connection resume request message transmitted by the UE.

9. The method of claim 8, further comprising:

as a result of determining that the generated authentication token is identical to the authentication token included in the RRC connection resume request message transmitted by the UE, the first network node transmitting to the second network node a message for triggering the second network node to transmit an RRC message to the UE.

10. The method of claim 9, wherein the message sent to the second network node comprises a UE context for the UE.

11. The method of claim 5, wherein the method further comprises obtaining the first RRC connection resume request message, and obtaining the first RRC connection resume request message comprises the first network node receiving a message transmitted by a second network node, wherein the message transmitted by the second network node comprises the first RRC connection resume request and an authentication token.

12. The method of claim 11, further comprising the first network node determining whether the generated authorization token is identical to the received authorization token.

13. A user equipment (UE), the UE comprising:
memory; and
processing circuitry, wherein the UE is configured to perform the method of claim 1.

14. A network node, the network node comprising:
memory; and
processing circuitry, wherein the network node is configured to perform the method of claim 1.

15. A method for generating an authentication token, the method comprising:
obtaining a first Radio Resource Control (RRC) connection resume request message that comprises a first field containing a cause value and a second field containing an identity value, but the first RRC connection resume request message does not include any security token field, and wherein the first RRC connection resume request message is encoded according to an Unaligned Packed Encoding Rule; and
using the entire first RRC connection resume request message to generate an authentication token.

16. A method for generating an authentication token, the method comprising:
obtaining a first Radio Resource Control (RRC) connection resume request message that comprises: i) a resume cause field containing a cause value, ii) a resume identity field containing an identity value, and iii) a token field having a first type, wherein the first RRC connection resume request message is encoded according to an Unaligned Packed Encoding Rule; and
using the entire first RRC connection resume request message to generate an authentication token.

17. The method of claim 16, wherein the method is performed by a user equipment (UE), and the method further comprises:
the UE generating a second RRC connection resume request message that comprises: i) a cause field that contains the cause value, ii) an identity field containing the identity value, and iii) a token field that contains the generated authentication token; and
transmitting the second RRC connection resume request message to a network node of an access network.

18. The method of claim 17, wherein
the first type is NULL, and
the token field of the second RRC connection resume request message has a type of bit string.

* * * * *